United States Patent
Stewart et al.

(10) Patent No.: US 10,586,433 B2
(45) Date of Patent: Mar. 10, 2020

(54) AUTOMATIC DETECTION OF ZONES OF INTEREST IN A VIDEO

(71) Applicant: GOOGLE LLC, Mountain View, CA (US)

(72) Inventors: James Edward Stewart, Mountain View, CA (US); George Alban Heitz, III, Mountain View, CA (US); Joe Delone Venters, Alameda, CA (US); Seungho Yang, Mountain View, CA (US); Mehul Nariyawala, Los Altos, CA (US); Cameron Hill, San Francisco, CA (US); Yohannes Berhanu Kifle, San Carlos, CA (US); Sayed Yusef Shafi, San Jose, CA (US); Sahana Mysore, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 134 days.

(21) Appl. No.: 15/431,710

(22) Filed: Feb. 13, 2017

(65) Prior Publication Data
US 2018/0232592 A1    Aug. 16, 2018

(51) Int. Cl.
G06K 9/20      (2006.01)
G08B 13/196   (2006.01)
G06K 9/00      (2006.01)

(52) U.S. Cl.
CPC ... *G08B 13/19684* (2013.01); *G06K 9/00771* (2013.01); *G08B 13/19606* (2013.01); *G08B 13/19608* (2013.01)

(58) Field of Classification Search
CPC .......... G06K 9/00771; G08B 13/19606; G08B 13/19608; G08B 13/19684
See application file for complete search history.

(56) References Cited

U.S. PATENT DOCUMENTS

| 2009/0288011 | A1* | 11/2009 | Piran | G08B 13/19693 |
| | | | | 715/720 |
| 2011/0316697 | A1* | 12/2011 | Krahnstoever | G08B 13/19608 |
| | | | | 340/540 |

(Continued)

OTHER PUBLICATIONS

Alan J. Lipton et qal., Moving Target Classification and Tracking from Real-time Vido, p. 8-14, 1998 IEEE.*

(Continued)

*Primary Examiner* — Mekonen T Bekele
(74) *Attorney, Agent, or Firm* — Morgan, Lewis & Bockius LLP

(57) ABSTRACT

A method at a computing system includes: obtaining video of an environment including a plurality of objects, wherein the video has a field of view; identifying one or more objects of the plurality of objects within the field of view; defining a zone of interest associated with a first object of the one or more objects, including identifying the zone of interest as one of an alerting zone or a suppression zone; subsequent to the defining, detecting one or more motion events captured in the video occurring at least partially within the zone of interest; when the zone of interest is an alerting zone, causing one or more notifications of the one or more motion events to be issued; and when the zone is a suppression zone, suppressing notifications of the one or more motion events.

20 Claims, 31 Drawing Sheets

(56) References Cited

U.S. PATENT DOCUMENTS

| | | | | |
|---|---|---|---|---|
| 2012/0026308 A1* | 2/2012 | Johnson | ............ | G06K 9/00369 |
| | | | | 348/77 |
| 2014/0047027 A1* | 2/2014 | Moyers | ................. | H04L 51/04 |
| | | | | 709/204 |
| 2014/0218517 A1* | 8/2014 | Kim | .................... | H04L 12/2818 |
| | | | | 348/143 |
| 2014/0277795 A1* | 9/2014 | Matsuoka | .......... | G06Q 30/0202 |
| | | | | 700/291 |
| 2015/0199892 A1* | 7/2015 | Johnson | ............ | G08B 21/0476 |
| | | | | 348/77 |
| 2015/0287310 A1* | 10/2015 | Deliuliis; Julia R | ... | H04W 4/90 |
| | | | | 340/628 |
| 2015/0350265 A1* | 12/2015 | O'Brien | ................ | H04L 65/403 |
| | | | | 709/204 |
| 2016/0358436 A1* | 12/2016 | Wautier | ........... | G08B 13/19667 |
| 2016/0364114 A1* | 12/2016 | Von Dehsen | ....... | H04L 12/2807 |
| 2017/0155877 A1* | 6/2017 | Johnson | ................ | H04N 7/183 |

OTHER PUBLICATIONS

Lorena Calavia et al., A Semantic Autonomous Video Surveillance System for Dense, Camera Networks in Smart Cities,Sensors 2012, 12, 10407-10429.*

* cited by examiner

Camera thinks it sees a door. So we made an Activity Zone for you.

Now you'll get a special alert when something happens at your door.

Want to keep an eye on something else? Make your own custom zones.

Find out more about Activity Zones

AUTOMATIC DETECTION OF ZONES OF INTEREST IN A VIDEO

TECHNICAL FIELD

The disclosed implementations relate generally to video monitoring, including, but not limited, to automatically detecting zones of interest in a field of view of a video feed.

BACKGROUND

The advancement of internet and mobile technologies has enabled the adoption of remote video surveillance by users. Users can now monitor an area under video surveillance using a website or a mobile application. Such websites or mobile apps typically allow a user to view live video and/or saved video recordings, but otherwise provide little or no additional information regarding the videos. A user may specify certain parts of an area under video surveillance as zones of interest, such that, for examples, motion activity that occur in these zones have notification priority. However, having the user specify the zones place the burden on the user. Furthermore, the user may be unaware of the relationships between motion activity detected in the video and particular areas in the field of view of the camera.

SUMMARY

Accordingly, there is a need for methods and systems for automatic detection and definition of zones of interest in live and/or saved video. Such methods and systems optionally complement or replace conventional methods for defining zones of interest in live and/or saved video.

In accordance with some implementations, a method includes, at a computing system with one or more processors and one or more memory components: obtaining video of an environment including a plurality of objects, where the video has a field of view; identifying one or more objects of the plurality of objects within the field of view; defining a zone of interest associated with a first object of the one or more objects, including identifying the zone of interest as one of an alerting zone or a suppression zone; subsequent to the defining, detecting one or more motion events captured in the video occurring at least partially within the zone of interest; when the zone of interest is an alerting zone, causing one or more notifications of the one or more motion events to be issued; and when the zone is a suppression zone, suppressing notifications of the one or more motion events.

In accordance with some implementations, a computing system includes one or more processors, one or more memory components, and one or more programs stored in the one or more memory components and configured for execution by the one or more processors. The one or more programs include instructions for: obtaining video of an environment including a plurality of objects, where the video has a field of view; identifying one or more objects of the plurality of objects within the field of view; defining a zone of interest associated with a first object of the one or more objects, including identifying the zone of interest as one of an alerting zone or a suppression zone; subsequent to the defining, detecting one or more motion events captured in the video occurring at least partially within the zone of interest; when the zone of interest is an alerting zone, causing one or more notifications of the one or more motion events to be issued; and when the zone is a suppression zone, suppressing notifications of the one or more motion events.

In accordance with some implementations, a non-transitory computer readable storage medium stores one or more programs. The one or more programs include instructions, which, when executed by a computing system with one or more processors, cause the computing system to perform operations including: obtaining video of an environment including a plurality of objects, where the video has a field of view; identifying one or more objects of the plurality of objects within the field of view; defining a zone of interest associated with a first object of the one or more objects, including identifying the zone of interest as one of an alerting zone or a suppression zone; subsequent to the defining, detecting one or more motion events captured in the video occurring at least partially within the zone of interest; when the zone of interest is an alerting zone, causing one or more notifications of the one or more motion events to be issued; and when the zone is a suppression zone, suppressing notifications of the one or more motion events.

Thus, computing systems and electronic devices are provided with more efficient methods for detecting and defining zones of interest in live and/or saved video, thereby increasing the effectiveness, efficiency, and user satisfaction with such systems and devices. Such methods may complement or replace conventional methods for defining zones of interest in live and/or saved video.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
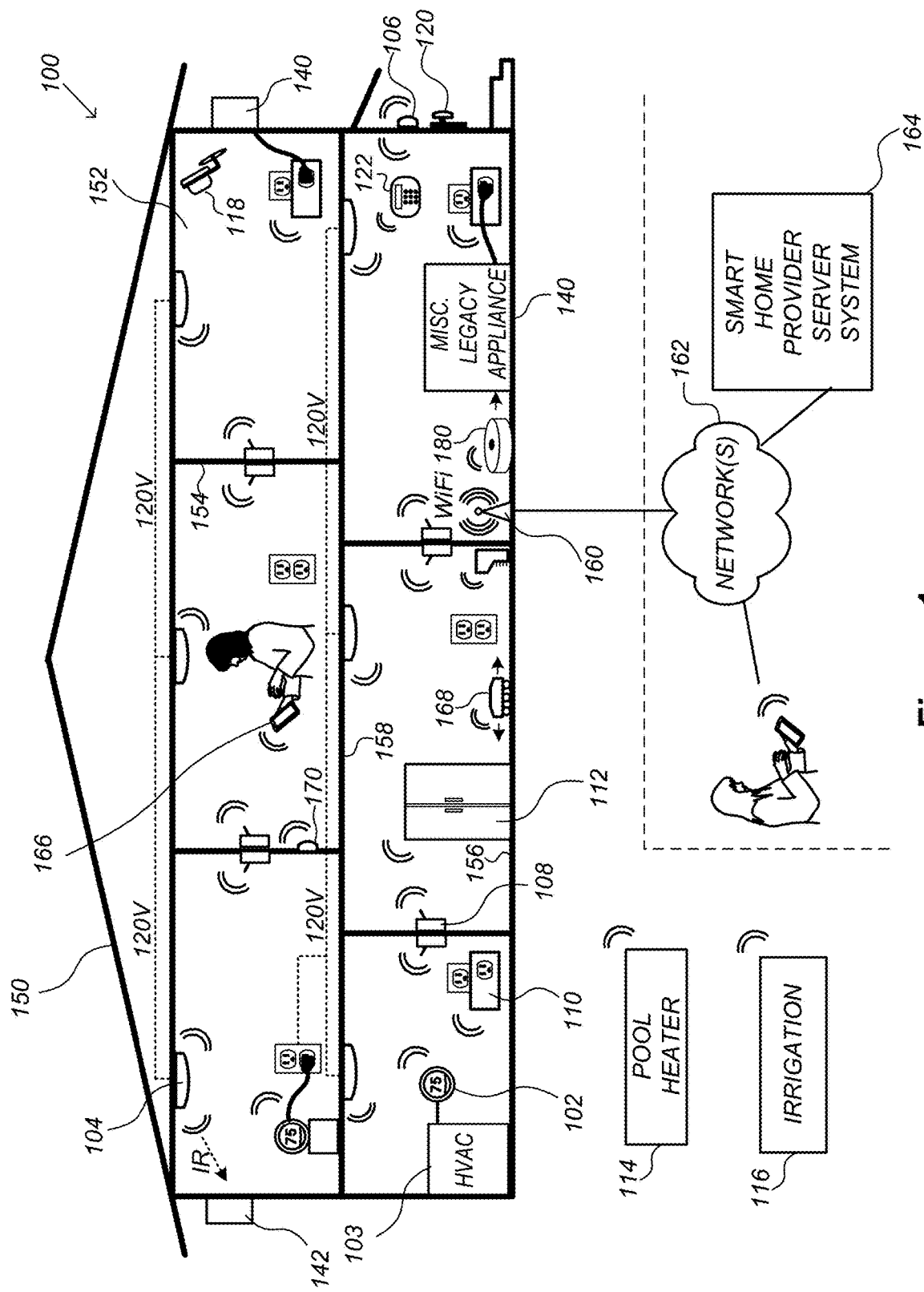
FIG. 1 is an example smart home environment, in accordance with some implementations.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, one or more devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. In some implementations, cameras 118 also capture video when other conditions or hazards are detected, in order to provide visual monitoring of the smart home environment 100 when those conditions or hazards occur. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). For example, cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may include one or more sound and/or vibration sensors for detecting abnormal sounds and/or vibrations. These sensors may be integrated with any of the devices described above. The sound sensors detect sound above a decibel threshold. The vibration sensors detect vibration above a threshold directed at a particular area (e.g., vibration on a particular window when a force is applied to break the window).

Conditions detected by the devices described above (e.g., motion, sound, vibrations, hazards) may be referred to collectively as alert events.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
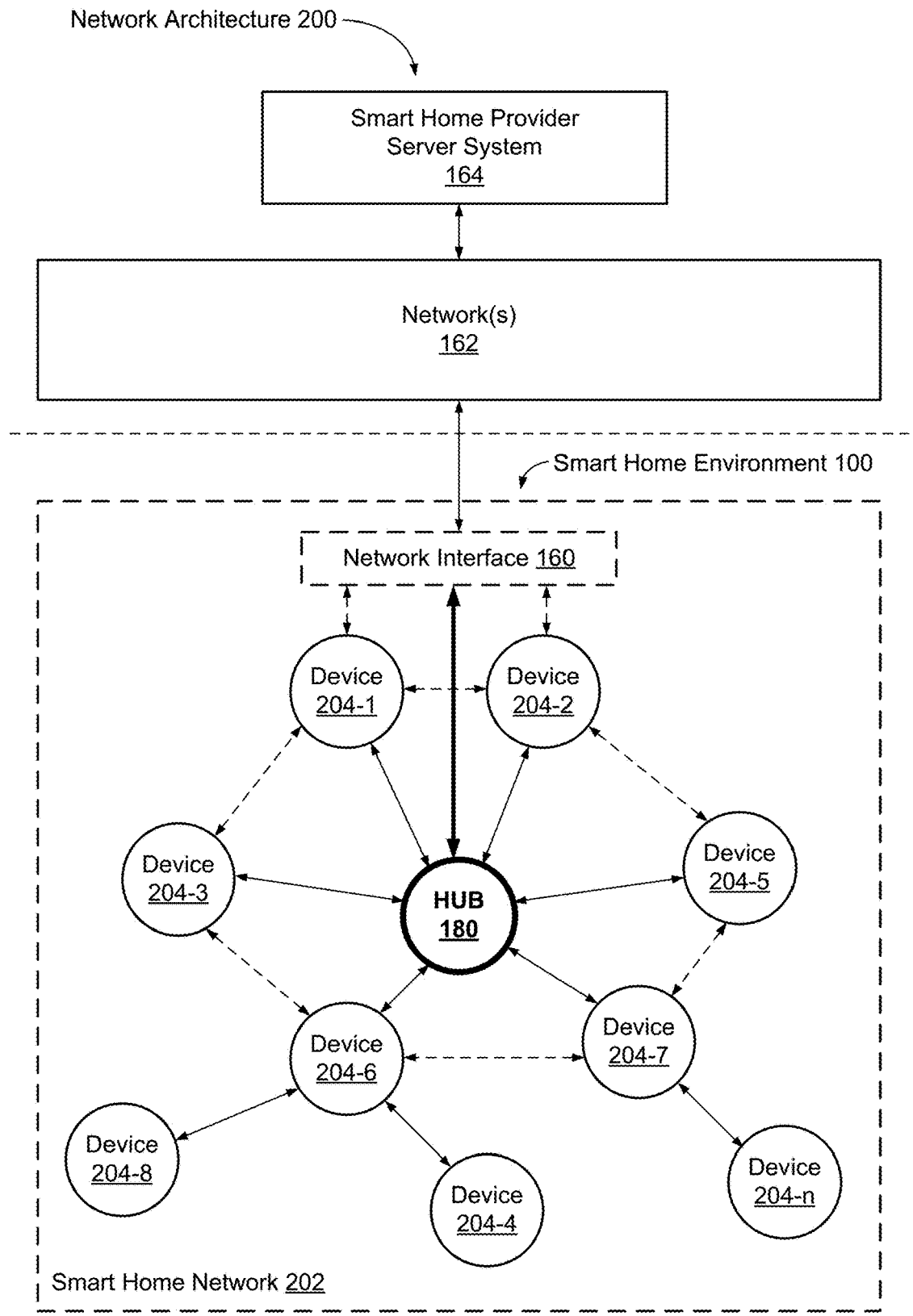
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In some implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
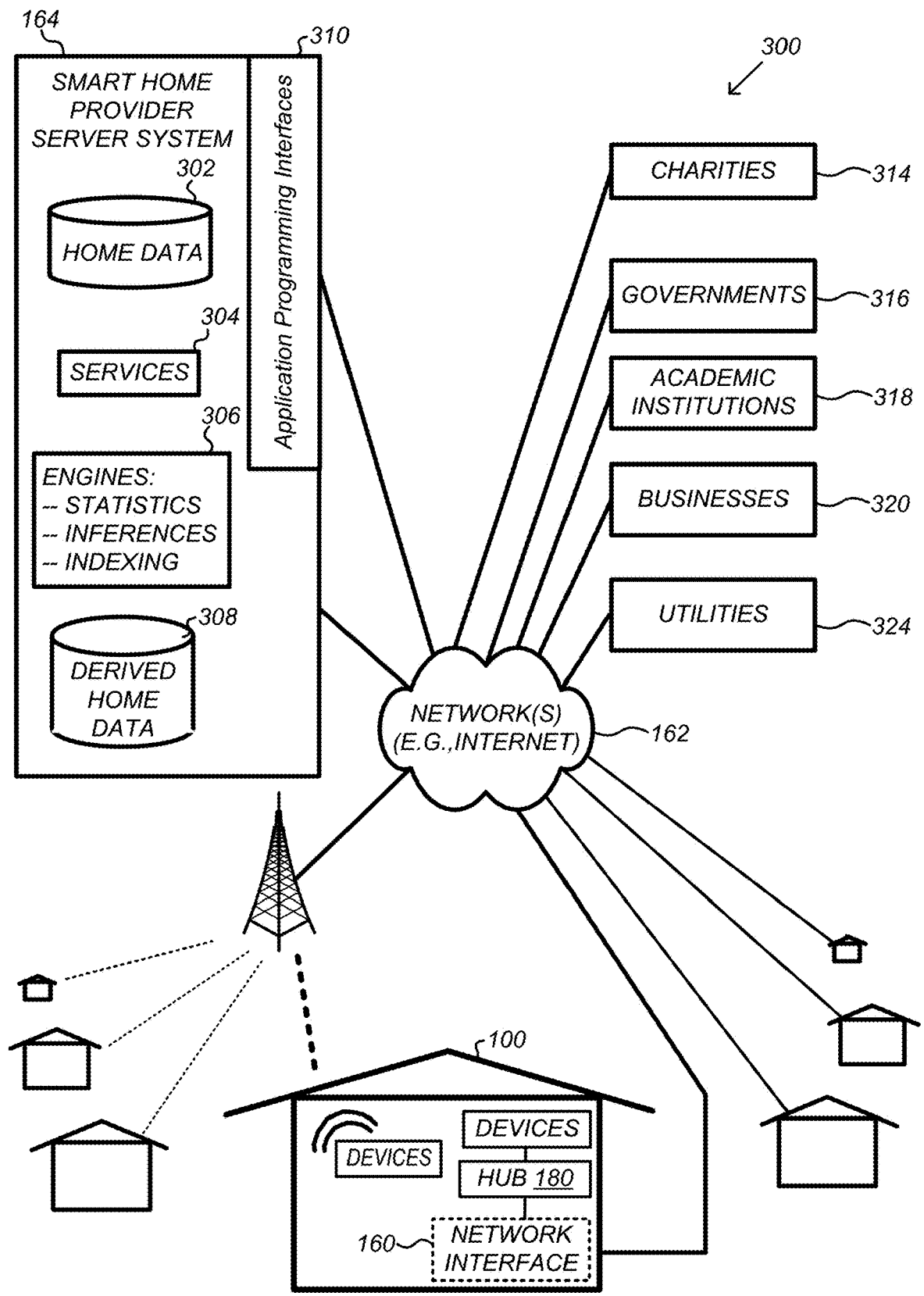
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
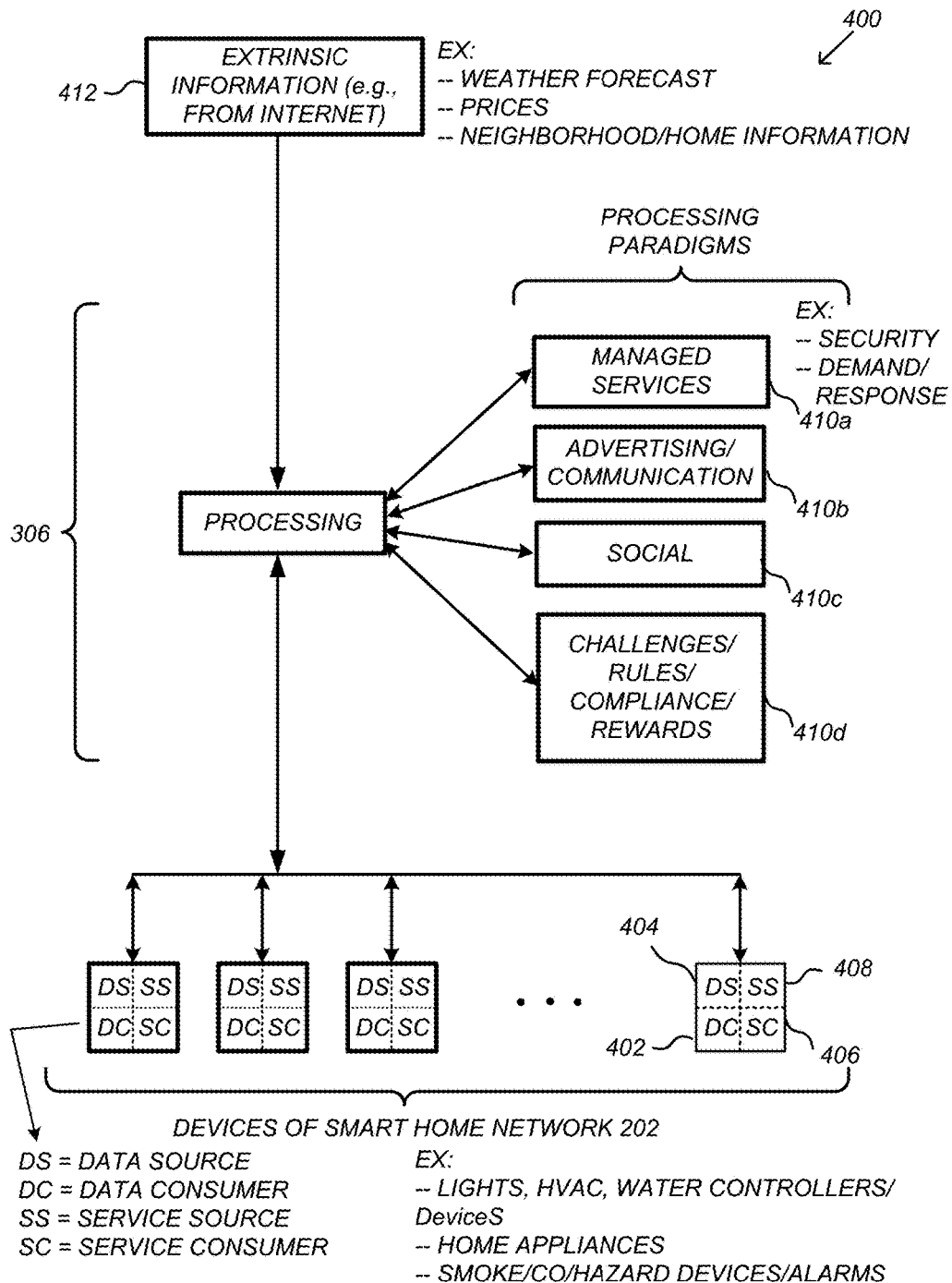
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410*a* that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410*b* that estimates characteristics (e.g., demographic information), desires and/or products of interest of a user based on device usage. Services, promotions, products or upgrades may then be offered or automatically provided to the user. In some implementations, processing engine 306 includes a social paradigm 410*c* that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410*d* that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5A:
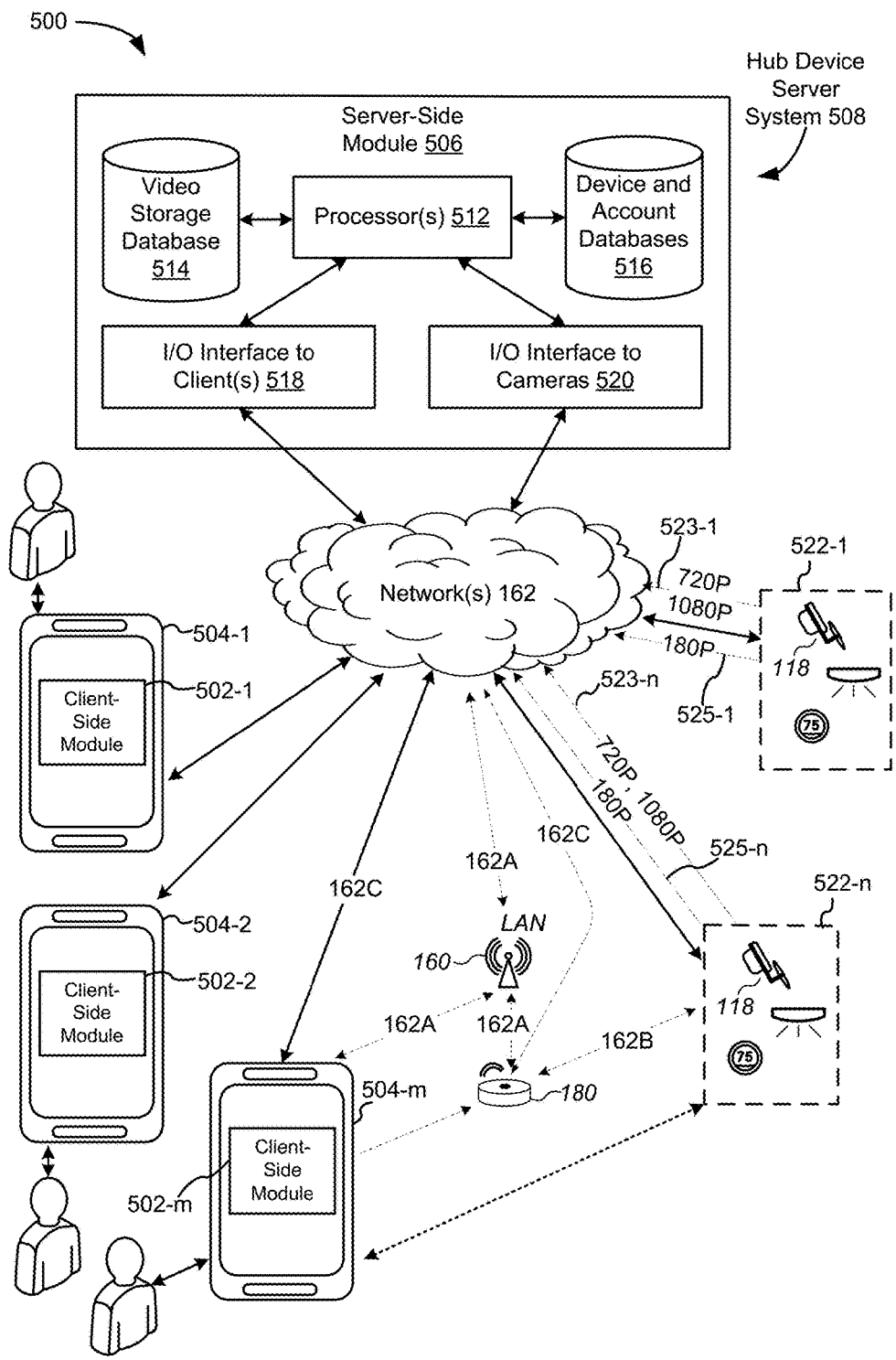
FIG. 5A is a representative operating environment in which a hub device server system interacts with client devices and hub devices communicatively coupled to local smart devices, in accordance with some implementations.

FIG. 5A illustrates a representative operating environment 500 in which a hub device server system 508 provides data processing for monitoring and facilitating review of alert events (e.g., motion events) in video streams captured by video cameras 118. As shown in FIG. 5A, the hub device server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the hub device server system 508 provides video monitoring data for the video source 522 to client devices 504 associated with the reviewer accounts. For example, the portable electronic device 166 is an example of a client device 504.

In some implementations, the smart home provider server system 164 or a component thereof serves as the hub device server system 508; the hub device server system 508 is a part or component of the smart home provider server system 164. In some implementations, the hub device server system 508 is a dedicated video processing server that provides video processing services to video sources and client devices 504 independent of other services provided by the hub device server system 508. An example of a video processing server is described below with reference to FIG. 5B.

In some implementations, each of the video sources 522 includes one or more video cameras 118 that capture video and send the captured video to the hub device server system 508 substantially in real-time. In some implementations, each of the video sources 522 optionally includes a controller device (not shown) that serves as an intermediary between the one or more cameras 118 and the hub device server system 508. The controller device receives the video data from the one or more cameras 118, optionally performs some preliminary processing on the video data, and sends the video data to the hub device server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub device server system 508.

In some implementations, a camera 118 of a video source 522 captures video at a first resolution (e.g., 720 P and/or 1080 P) and/or a first frame rate (24 frames per second), and sends the captured video to the hub device server system 508 at both the first resolution (e.g., the original capture resolution(s), the high-quality resolution(s) such as 1080 P and/or 720 P) and the first frame rate, and at a second, different resolution (e.g., 180 P) and/or a second frame rate (e.g., 5 frames per second or 10 frames per second). For example, the camera 118 captures a video 523-1 at 720 P and/or 1080 P resolution (the camera 118 may capture a video at 1080 P and create a downscaled 720 P version, or capture at both 720 P and 1080 P). The video source 522 creates a second (or third), rescaled (and optionally at a different frame rate than the version 523-1) version 525-1 of the captured video at 180 P resolution, and transmits both the original captured version 523-1 (i.e., 1080 P and/or 720 P) and the rescaled version 525-1 (i.e., the 180 P version) to the hub device server system 508 for storage. In some implementations, the rescaled version has a lower resolution, and optionally a lower frame rate, than the original captured video. The hub device server system 508 transmits the original captured version or the rescaled version to a client 504, depending on the context. For example, the hub device server system 508 transmits the rescaled version when transmitting multiple videos to the same client device 504 for concurrent monitoring by the user, and transmits the original captured version in other contexts. In some implementations, the hub device server system 508 downscales the original captured version to a lower resolution, and transmits the downscaled version.

In some implementations, a camera 118 of a video source 522 captures video at a first resolution (e.g., 720 P and/or 1080 P) and/or a first frame rate, and sends the captured video to the hub device server system 508 at the first resolution (e.g., the original capture resolution(s); the high-quality resolution(s) such as 1080 P and/or 720 P) and first frame rate for storage. When the hub device server system 508 transmits the video to a client device, the hub device server system 508 may downscale the video to a second, lower resolution (e.g., 180 P) and/or second, lower frame rate for the transmission, depending on the context. For example, the hub device server system 508 transmits the downscaled version when transmitting multiple videos to the same client device 504 for concurrent monitoring by the user, and transmits the original captured version in other contexts.

As shown in FIG. 5A, in accordance with some implementations, each of the client devices 504 includes a client-side module 502. The client-side module 502 communicates with a server-side module 506 executed on the hub device server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. In some implementations, the I/O interface to clients 518 or a transcoding proxy computer (not shown) rescales (e.g., downscales) and/or changes the frame rate of video for transmission to a client 504. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account. The video storage database 514 also includes in some implementations a collection of curated and condensed video frames (e.g., extracted-frames video, described further below) covering hours or days of stored raw video to facilitate fast, seamless user review/scrubbing using a client side module 502 through key events/cuepoints that occurred in those hours and days of stored video without needing to download to or review on a client device 504 the raw video directly.

In some implementations, the server-side module 506 receives information regarding alert events detected by other smart devices 204 (e.g., hazards, sound, vibration, motion). In accordance with the alert event information, the server-side module 506 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub device server system 508 is implemented on one or more standalone data processing apparatuses or a distributed network of computers. In some implementations, the hub device server system 508 also employs various virtual devices and/or services of third party service providers (e.g., third-party cloud service providers) to provide the underlying computing resources and/or infrastructure resources of the hub device server system 508. In some implementations, the hub device server system 508 includes, but is not limited to, a handheld computer, a tablet computer, a laptop computer, a desktop computer, or a combination of any two or more of these data processing devices or other data processing devices.

The server-client environment 500 shown in FIG. 5A includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub device server system 508 can vary in different implementations. For example, in some implementations, client-side module 502 is a thin-client that provides only user-facing input and output processing functions, and delegates all other data processing functionalities to a backend server (e.g., the hub device server system 508). Similarly, in some implementations, a respective one of the video sources 522 is a simple video capturing device that continuously captures and streams video data to the hub device server system 508 with no or limited local preliminary processing on the video data. Although many aspects of the present technology are described from the perspective of the hub device server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub device server system 508, the client device 504, and the video sources 522 cooperatively.

It should be understood that operating environment 500 that involves the hub device server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same subnetwork 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

In some implementations, the hub device 180 is omitted, and the functionality of the hub device 180 is performed by the hub device server system 508, video server system 552, or smart home provider server system 164.

Figure 5B:
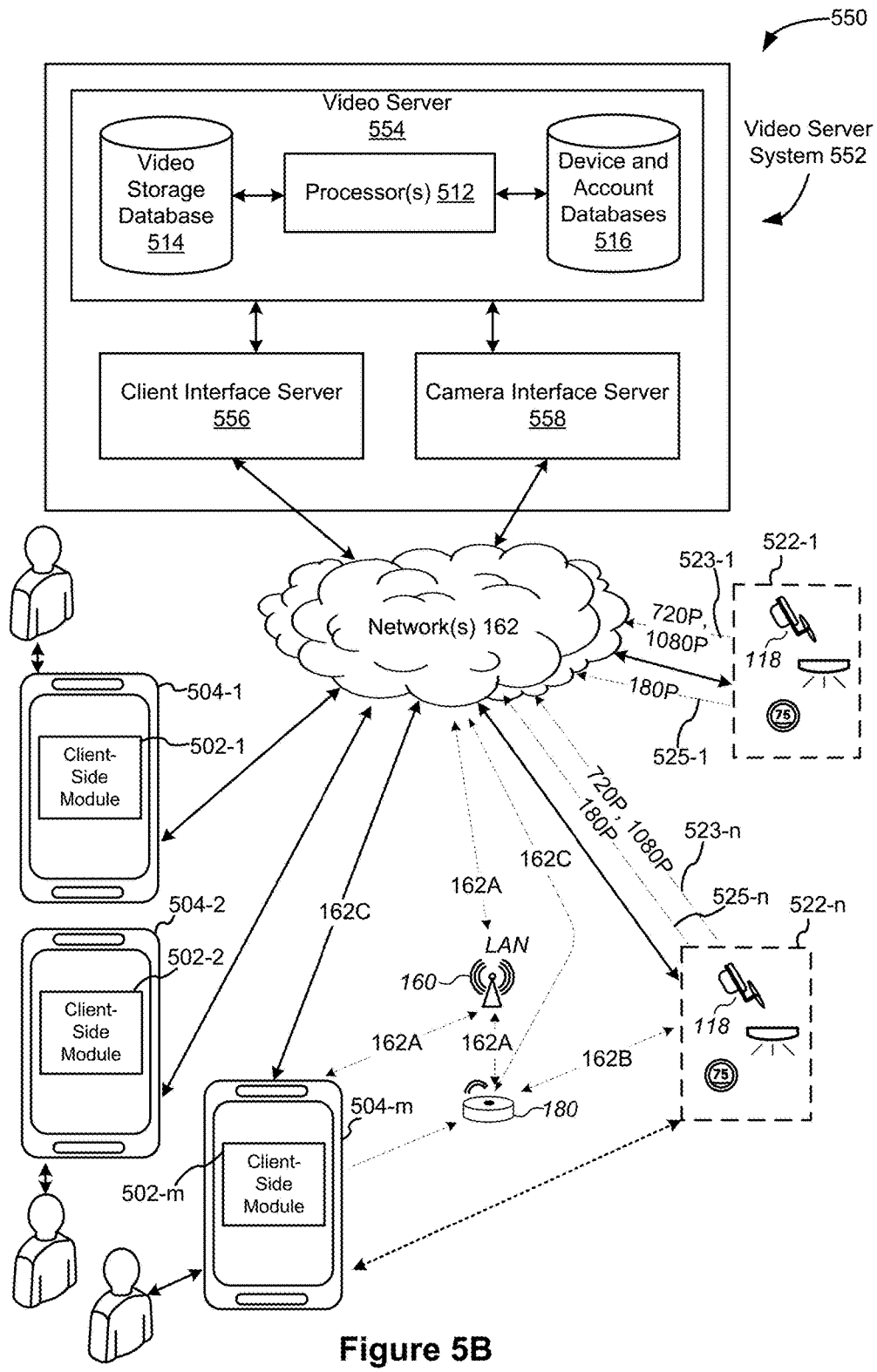
FIG. 5B is a representative operating environment in which a video server system interacts with client devices and hub devices communicatively coupled to local smart devices, in accordance with some implementations.

In some implementations, the hub device server system 508 is, or includes, a dedicated video processing server. FIG. 5B illustrates a representative operating environment 550 in which a video server system 552 serves as a dedicated video processing server and provides data processing for monitoring and facilitating review of alert events (e.g., motion events) in video streams captured by video cameras 118. As shown in FIG. 5B, the video server system 552 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the video server system 552 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 552; the video server system 552 is a part or component of the smart home provider server system 164. In some implementations, the video server system 552 is separate from the smart home provider server system 164, and provides video processing services to video sources 522 and client devices 504 independent of other services provided by the smart home provider server system 164. In some implementations, the smart home provider server system 164 and the video server system 552 are separate but communicate information with each other to provide functionality to users. For example, a detection of a hazard may be communicated by the smart home provider server system 164 to the video server system 552, and the video server system 552, in accordance with the communication regarding the detection of the hazard, records, processes, and/or provides video associated with the detected hazard.

In some implementations, each of the video sources 522 includes one or more video cameras 118 that capture video and send the captured video to the video server system 552 substantially in real-time. In some implementations, each of the video sources 522 optionally includes a controller device (not shown) that serves as an intermediary between the one or more cameras 118 and the video server system 552. The controller device receives the video data from the one or more cameras 118, optionally, performs some preliminary processing on the video data, and sends the video data to the video server system 552 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 552.

In some implementations, a camera 118 of a video source 522 captures video at a first resolution (e.g., 720 P and/or 1080 P) and/or a first frame rate (24 frames per second), and sends the captured video to the video server system 552 at both the first resolution (e.g., the original capture resolution(s), the high-quality resolution(s)) and the first frame rate, and a second, different resolution (e.g., 180 P) and/or a second frame rate (e.g., 5 frames per second or 10 frames per second). For example, the camera 118 captures a video 523-1 at 720 P and/or 1080 P resolution (the camera 118 may capture a video at 1080 P and create a downscaled 720 P version, or capture at both 720 P and 1080 P). The video source 522 creates a second (or third), rescaled (and optionally at a different frame rate than the version 523-1) version 525-1 of the captured video at 180 P resolution, and transmits both the original captured version 523-1 (i.e., 1080 P and/or 720 P) and the rescaled version 525-1 (i.e., the 180 P version) to the video server system 552 for storage. In some implementations, the rescaled version has a lower resolution, and optionally a lower frame rate, than the original captured video. The video server system 552 transmits the original captured version or the rescaled version to a client 504, depending on the context. For example, the video server system 552 transmits the rescaled version when transmitting multiple videos to the same client device 504 for concurrent monitoring by the user, and transmits the original captured version in other contexts. In some implementations, the video server system 552 downscales the original captured version to a lower resolution, and transmits the downscaled version.

In some implementations, a camera 118 of a video source 522 captures video at a first resolution (e.g., 720 P and/or 1080 P)) and/or a first frame rate, and sends the captured video to the video server system 552 at the first resolution (e.g., the original capture resolution(s), the high-quality resolution(s) such as 1080 P and/or 720 P) and the first fame rate for storage. When the video server system 552 transmits the video to a client device, the video server system 552 may downscale the video to a second, lower resolution (e.g., 180 P) and/or second, lower frame rate for the transmission, depending on the context. For example, the video server system 552 transmits the downscaled version when transmitting multiple videos to the same client device 504 for concurrent monitoring by the user, and transmits the original captured version in other contexts.

As shown in FIG. 5B, in accordance with some implementations, each of the client devices 504 includes a client-side module 502. The client-side module 502 communicates with the video server system 552 through the one or more networks 162. In some implementations, the video server system 552 includes a video server 552, a client interface server 556, and a camera interface server 558. In some implementations, the video server system 552 includes the server-side module 506 and its components and modules (FIG. 5A) or one or more respective components and/or modules of the server-side module 506. The client-side module 502 provides client-side functionalities for the event monitoring and review processing and communications with the video server system 552. The video server system 552 provides server-side functionalities for event monitoring and review processing for any number of client-side modules 502 each residing on a respective client device 504. The video server system 556 also provides server-side functionalities for video processing and camera control for any number of the video sources 522, including any number of control devices and the cameras 118.

In some implementations, the video server 554 includes one or more processors 512, a video storage database 514, and device and account databases 516. In some implementations, the video server system 552 also includes a client interface server 556 and a camera interface server 558. The client interface server 556 provides an I/O interface to one or more client devices 504, and the camera interface server 558 provides an I/O interface to one or more video sources 520. The client interface server 556 facilitates the client-facing input and output processing for the video server system 552. For example, the client interface server 556 generates web pages for reviewing and monitoring video captured by the video sources 522 in a web browser application at a client 504. In some implementations, the client interface server 556 or a transcoding proxy computer rescales (e.g., downscales) and/or changes the frame rate of video for transmission to a client 504. In some implementations, the client interface server 504 also serves as the transcoding proxy. The databases 516 store a plurality of profiles for reviewer accounts registered with the video processing server, where a respective user profile includes account credentials for a respective reviewer account, and one or more video sources linked to the respective reviewer account. The camera interface server 558 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, event masks, alert events, and camera histories, for use in data processing for event monitoring and review for each reviewer account.

In some implementations, the video server system 552 receives information regarding alert events detected by other smart devices 204 (e.g., hazards, sound, vibration, motion. In accordance with the alert event information, the video server system 552 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 552 is implemented on one or more standalone data processing apparatuses or a distributed network of computers. In some implementations, the video server 554, the client interface server 556, and the camera interface server 558 are each respectively implemented on one or more standalone data processing apparatuses or a distributed network of computers. In some implementations, the video server system 552 also employs various virtual devices and/or services of third party service providers (e.g., third-party cloud service providers) to provide the underlying computing resources and/or infrastructure resources of the video server system 552. In some implementations, the video server system 552 includes, but is not limited to, a handheld computer, a tablet computer, a laptop computer, a desktop computer, or a combination of any two or more of these data processing devices or other data processing devices.

The server-client environment 550 shown in FIG. 5B includes both a client-side portion (e.g., the client-side module 502) and a server-side portion (e.g., the components and modules in the video server system 552). The division of functionalities between the client and server portions of operating environment 550 can vary in different implementations. Similarly, the division of functionalities between the video source 522 and the video server system 552 can vary in different implementations. For example, in some implementations, client-side module 502 is a thin-client that provides only user-facing input and output processing functions, and delegates all other data processing functionalities to a backend server (e.g., the video server system 552). Similarly, in some implementations, a respective one of the video sources 522 is a simple video capturing device that continuously captures and streams video data to the video server system 552 with no or limited local preliminary processing on the video data. Although many aspects of the present technology are described from the perspective of the video server system 552, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the video server system 552, the client device 504, and the video sources 522 cooperatively.

It should be understood that operating environment 550 that involves the video server system 552, the video sources 522 and the video cameras 118 is merely an example. Many aspects of operating environment 550 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-$m$) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-$n$ exchange data with the hub device 180. Alternatively, in some situations, some of the electronic devices of the video sources 522-$n$ communicate with the network interface device 160 directly via the same sub-network 162A that couples devices 160, 180 and 504-$m$. In some implementations (e.g., in the network 162C), both the client device 504-$m$ and the electronic devices of the video sources 522-$n$ communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-$n$. As explained above, the network interface device 160 and the hub device 180 optionally communicate with each other via a sub-network 162A.

In some implementations, a video source 522 may be private (e.g., its captured videos and history are accessible only to the associated user/account), public (e.g., its captured videos and history are accessible by anyone), or shared (e.g., its captured videos and history are accessible only to the associated user/account and other specific users/accounts with whom the associated user has authorized access (e.g., by sharing with the other specific users)). Whether a video source 522 is private, public, or shared is configurable by the associated user.

In some implementations, the camera 118 also performs preliminary motion detection on video captured by the camera 118. For example, the camera 118 analyzes the captured video for significant changes in pixels. When motion is detected by the preliminary motion detection, the camera 118 transmits information to the hub device server system 508 or video server system 552 informing the server system of the preliminary detected motion. The hub device server system 508 or video server system 552, in accordance with the information of the detected motion, may activate sending of a motion detection notification to a client device 504, log the preliminary detected motion as an alert event, and/or perform additional analysis of the captured video to confirm and/or classify the preliminary detected motion.

Figure 6:
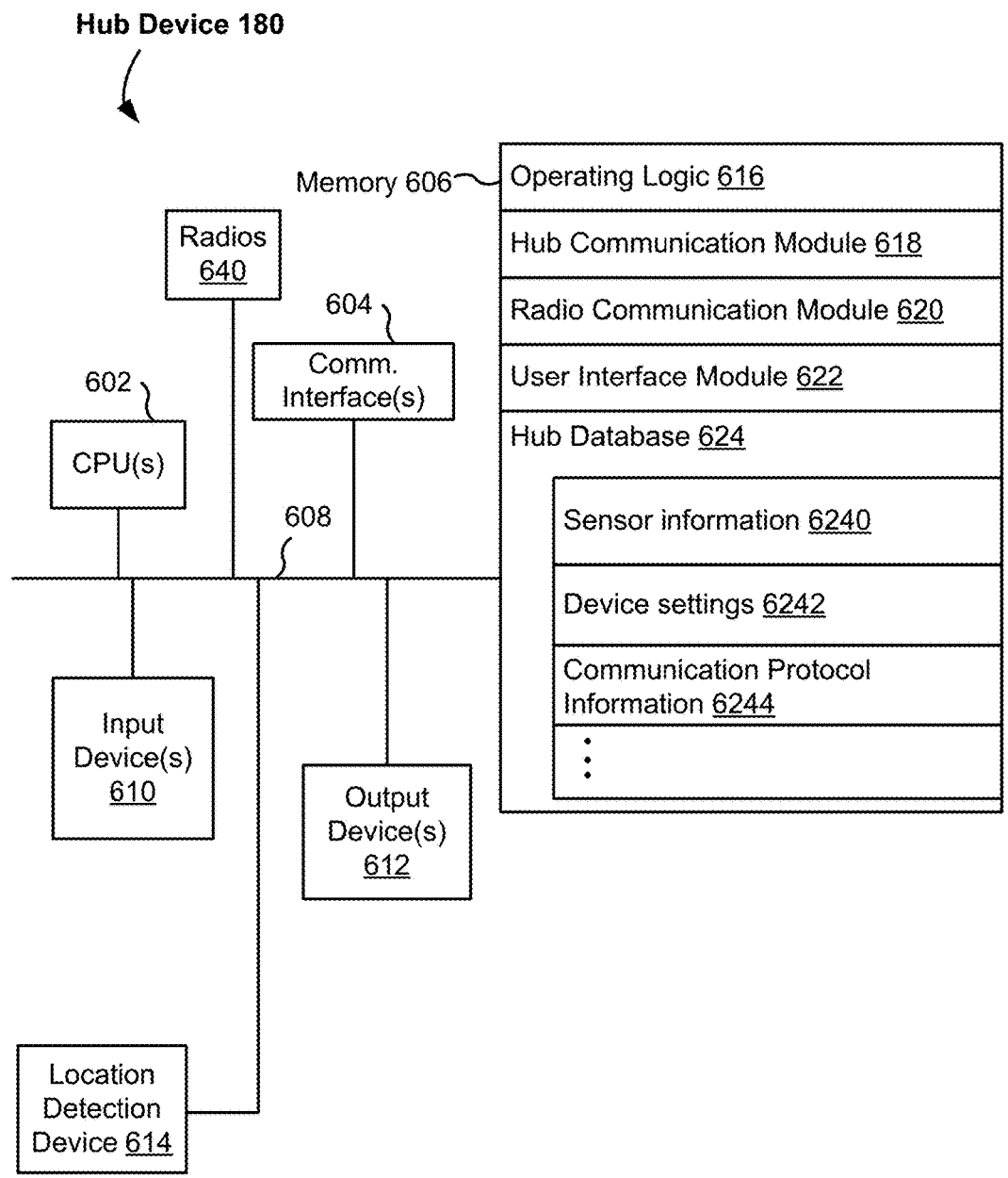
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

Operating logic 616 including procedures for handling various basic system services and for performing hardware dependent tasks;

Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);

Radio Communication Module 620 for connecting the hub device 180 to other devices (e.g., controller devices, smart devices 204 in smart home environment 100, client devices 504) via one or more radio communication devices (e.g., radios 640);

User interface module 622 for providing and displaying a user interface in which settings, captured data, and/or other data for one or more devices (e.g., smart devices 204 in smart home environment 100) can be configured and/or viewed; and Hub device database 624, including but not limited to:

Sensor information 6240 for storing and managing data received, detected, and/or transmitted by one or more sensors of the hub device 180 and/or one or more other devices (e.g., smart devices 204 in smart home environment 100);

Device settings 6242 for storing operational settings for one or more devices (e.g., coupled smart devices 204 in smart home environment 100); and Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7A:
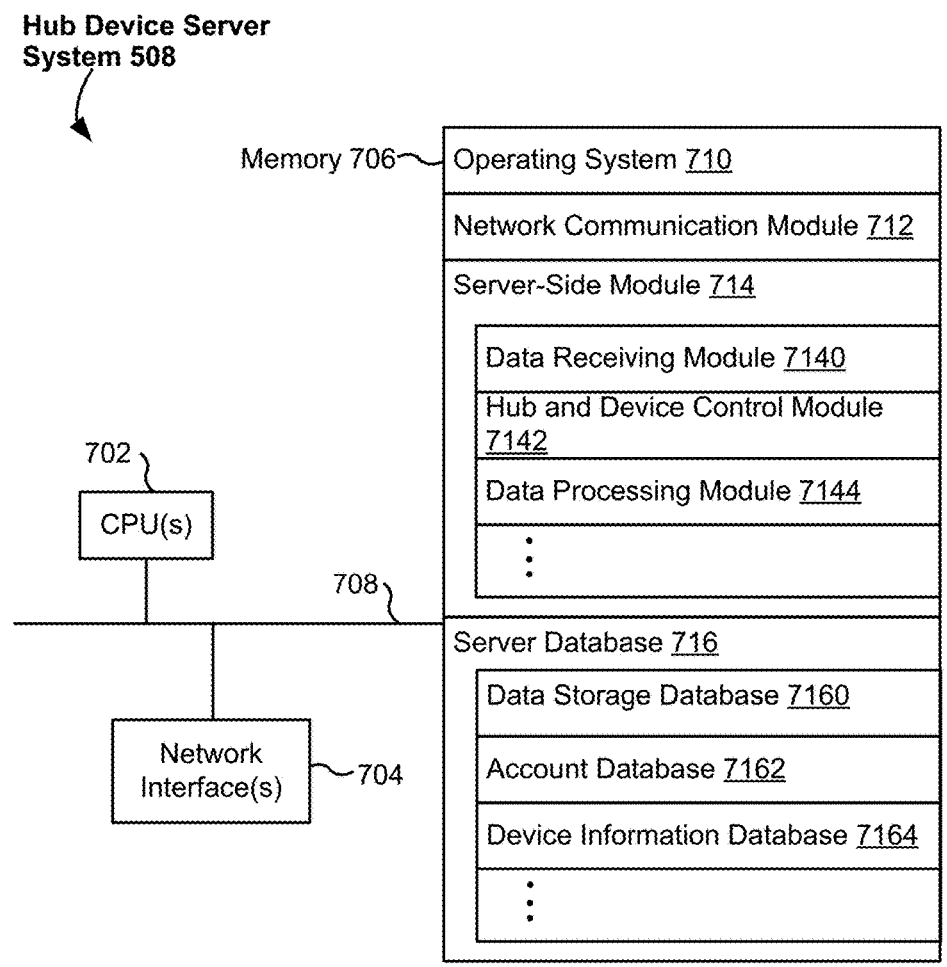
FIG. 7A is a block diagram illustrating a representative hub device server system, in accordance with some implementations.

FIG. 7A is a block diagram illustrating the hub device server system 508 in accordance with some implementations. The hub device server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 710 including procedures for handling various basic system services and for performing hardware dependent tasks;

Network communication module 712 for connecting the hub device server system 508 to other systems and devices (e.g., client devices, electronic devices, and systems connected to one or more networks 162, FIGS. 1-5B) via one or more network interfaces 704 (wired or wireless);

Server-side module 714, which provides server-side functionalities for device control, data processing and data review, including but not limited to:

Data receiving module 7140 for receiving data from electronic devices (e.g., video data from a camera 118, FIG. 1) via the hub device 180, and preparing the received data for further processing and storage in the data storage database 7160;

Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 7144 for processing the data provided by the electronic devices, and/or preparing and sending processed data to a device for review (e.g., client devices 504 for review by a user); and Server database 716, including but not limited to:

Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;

Account database 7162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and Device Information Database 7164 for storing device information related to one or more hub devices, e.g., device identifiers and hub device specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 7B:
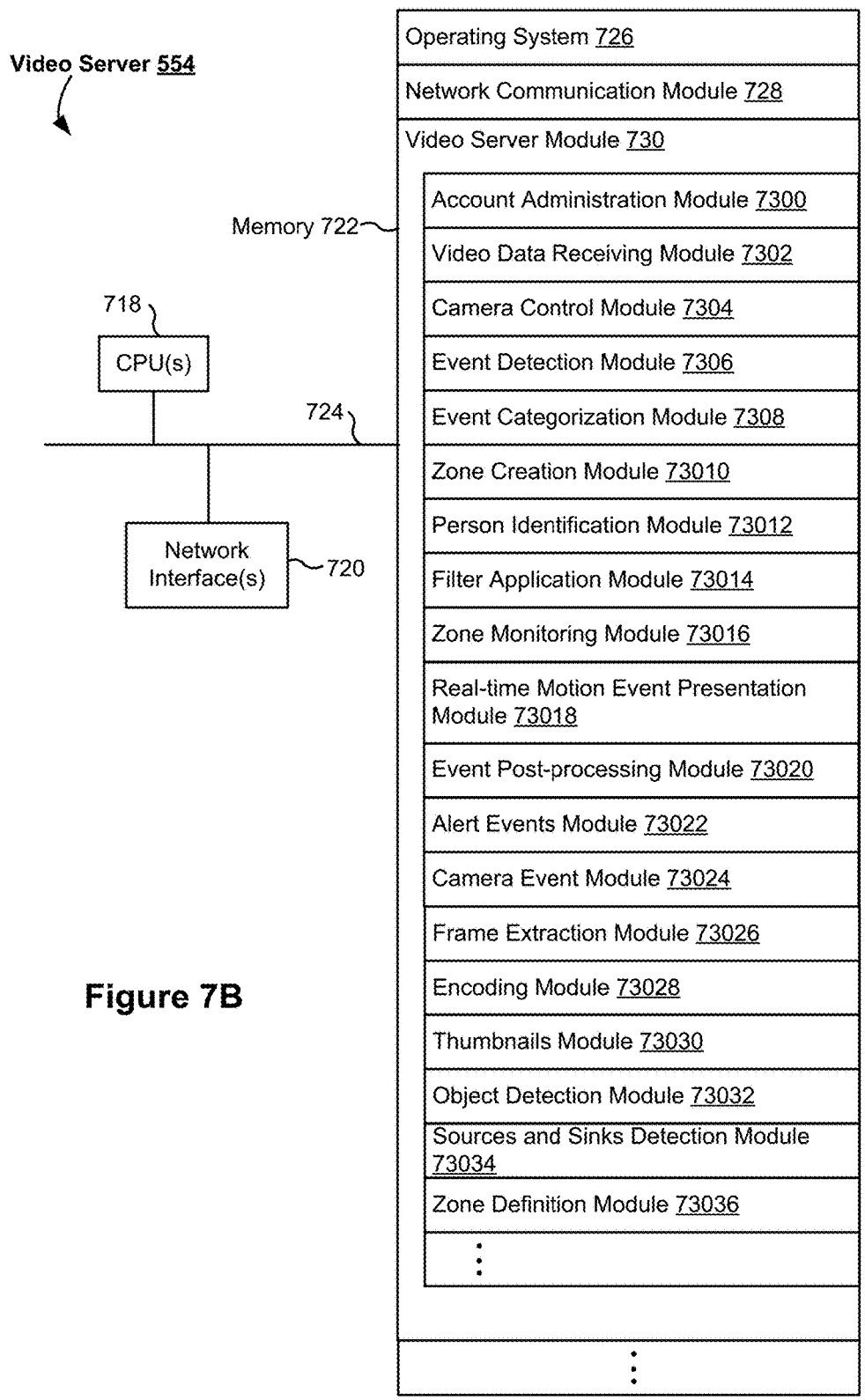
FIGS. 7B-7C are block diagrams illustrating a representative video server system, in accordance with some implementations.
Figure 7C:
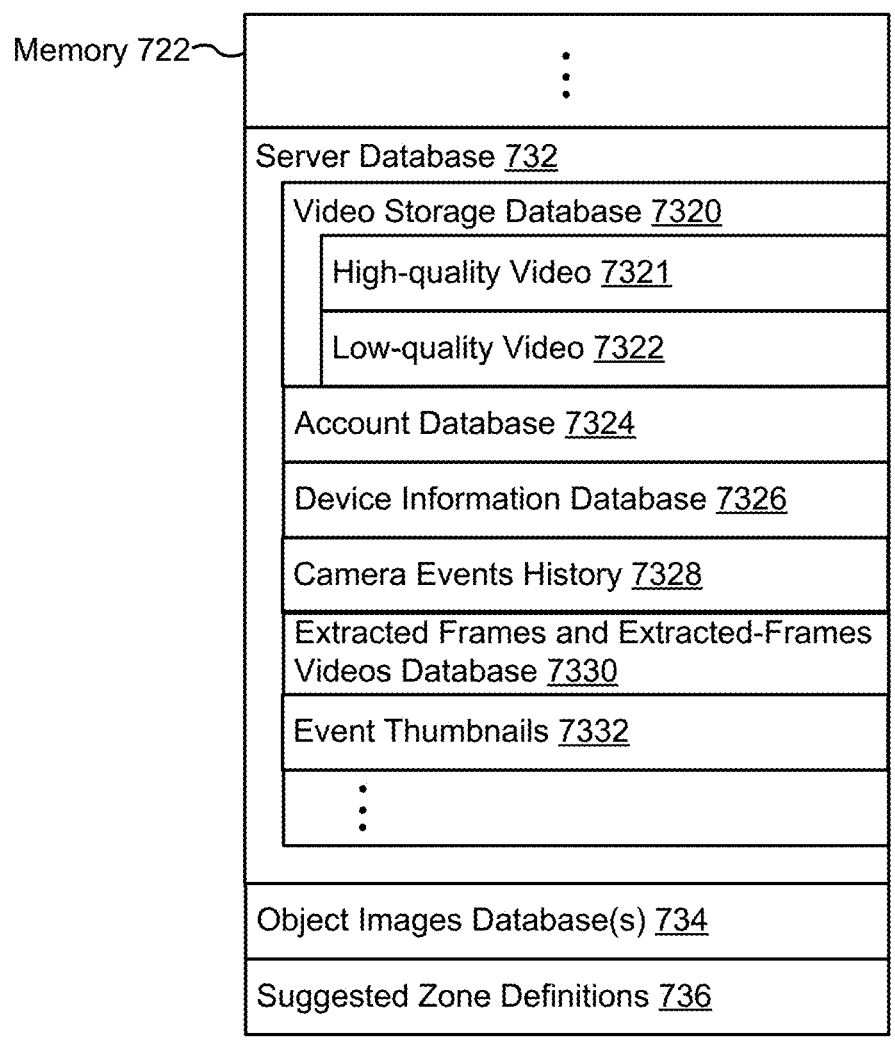

FIGS. 7B-7C are block diagrams illustrating the video server 554 in accordance with some implementations. The video server 554, typically, includes one or more processing units (CPUs) 718, one or more network interfaces 720, memory 722, and one or more communication buses 724 for interconnecting these components (sometimes called a chipset). Memory 722 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 722, optionally, includes one or more storage devices remotely located from one or more processing units 718. Memory 722, or alternatively the non-volatile memory within memory 722, includes a non-transitory computer readable storage medium. In some implementations, memory 722, or the non-transitory computer readable storage medium of memory 722, stores the following programs, modules, and data structures, or a subset or superset thereof:

- Operating system 726 including procedures for handling various basic system services and for performing hardware dependent tasks;
- Network communication module 728 for connecting the video server 554 to other systems and devices (e.g., client devices, electronic devices, and systems connected to one or more networks 162, FIGS. 1-5B) via one or more network interfaces 720 (wired or wireless);
- Video server module 730, which provides server-side data processing and functionalities for video and event monitoring and review, including but not limited to:
  - Account administration module 7300 for creating reviewer accounts, performing camera registration processing to establish associations between video sources to their respective reviewer accounts, and providing account login-services to the client devices 504;
  - Video data receiving module 7302 for receiving raw video data from the video sources 522, and preparing the received video data for event processing and long-term storage in the video storage database 514;
  - Camera control module 7304 for generating and sending server-initiated control commands to modify the operation modes of the video sources, and/or receiving and forwarding user-initiated control commands to modify the operation modes of the video sources 522;
  - Event detection module 7306 for detecting motion event candidates in video streams from each of the video sources 522, including motion track identification, false positive suppression, and event mask generation and caching;
  - Event categorization module 7308 for categorizing motion events detected in received video streams;
  - Zone creation module 73010 for generating zones of interest in accordance with user input;
  - Person identification module 73012 for identifying characteristics associated with presence of humans in the received video streams;
  - Filter application module 73014 for selecting event filters (e.g., event categories, zones of interest, a human filter, etc.) and applying the selected event filter to past and new motion events detected in the video streams;
  - Zone monitoring module 73016 for monitoring motions within selected zones of interest and generating notifications for new motion events detected within the selected zones of interest, where the zone monitoring takes into account changes in surrounding context of the zones and is not confined within the selected zones of interest;
  - Real-time motion event presentation module 73018 for dynamically changing characteristics of event indicators displayed in user interfaces as new event filters, such as new event categories or new zones of interest, are created, and for providing real-time notifications as new motion events are detected in the video streams; and
  - Event post-processing module 3020 for providing summary time-lapse for past motion events detected in video streams, and providing event and category editing functions to user for revising past event categorization results;
  - Alert events module 73022 for receiving information on alert events (e.g., detected hazards, detected sounds, etc.), instructing cameras 118 to capture video in accordance with alert event information, and determining chronologies of alert events;
  - Camera events module 73024 for associating captured video with alert events, from the same smart home environment 100, that are proximate or contemporaneous in time, and logging camera histories of camera events;
  - Frame extraction module 73026 for extracting frames from raw video data from the video sources 522;
  - Encoding module 73028 for encoding extracted-frames video using frames extracted by the frame extraction module 73026;
  - Thumbnails module 73030 for selecting frames for and generating thumbnails for respective portions of video corresponding to events or alerts;
  - Object detection module 73032 for detecting objects and corresponding contours in video feeds;
  - Sources and sinks detection module 73034 for detecting sources and sinks of motion activity in video feeds; and
  - Zone definition module 73036 for generating suggested zone definitions for detected objects;
- Server database 732, including but not limited to:
  - Video storage database 7320 storing raw video data associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, location of the cameras 118, creation time, duration, etc.) associated with the motion events;
  - Account database 7324 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
  - Device Information Database 7326 for storing device information related to one or more hub devices, e.g., device identifiers and hub device specific secrets, independently of whether the corresponding hub devices have been associated with any user account;

Camera events history 7328 for storing per-camera histories of camera events, including alert events, chronologies of alert events, and references to associated videos in the video storage database 7320;

Extracted frames and extracted-frames videos database 7330 for storing frames extracted from videos received from cameras 118 (e.g., extracted from high quality videos 7321) and for storing extracted-frames video generated by encoding module 73028 by encoding (e.g., in H.264 encoding format) series of extracted frames; and Event thumbnails 7332 for storing thumbnails representative of portions of videos corresponding to events or alerts;

Object images database(s) 734 for storing one or more databases (e.g., machine-trained databases) of images of objects; and Suggested zone definitions 736 for storing suggested zone definitions.

Video data stored in the video storage database 7320 includes high-quality versions 7321 and low-quality versions 7322 of videos associated with each of the video sources 522. High-quality video 7321 includes video in relatively high resolutions (e.g., 720 P and/or 1080 P) and relatively high frame rates (e.g., 24 frames per second). Low-quality video 7322 includes video in relatively low resolutions (e.g., 180 P) and relatively low frame rates (e.g., 5 frames per second, 10 frames per second).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 722, optionally, stores a subset of the modules and data structures identified above. Furthermore, memory 722, optionally, stores additional modules and data structures not described above.

Figure 7D:
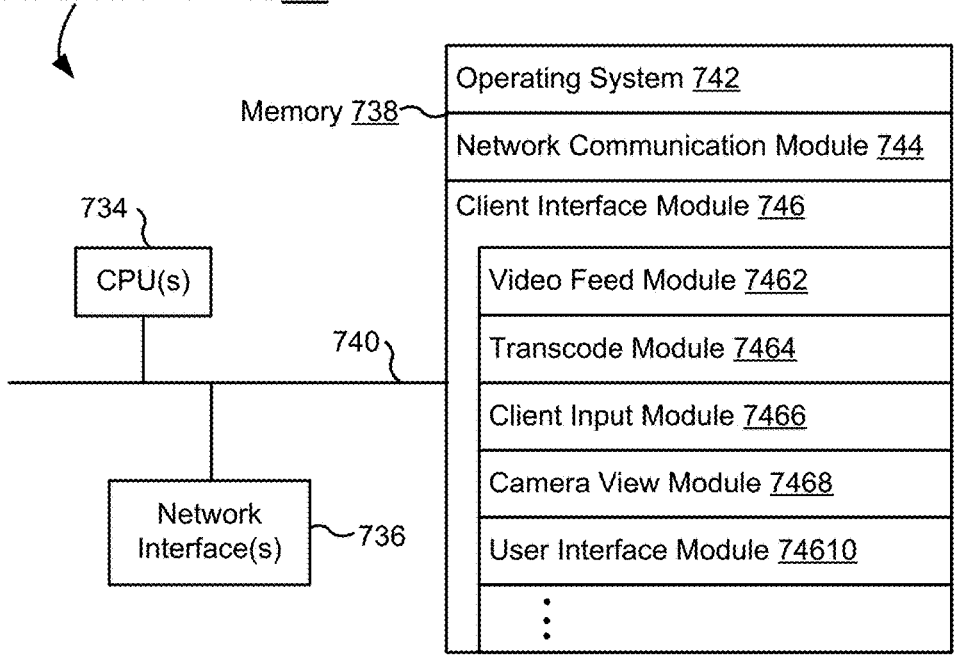
FIG. 7D is a block diagram illustrating a representative client interface server, in accordance with some implementations.

FIG. 7D is a block diagram illustrating the client interface server 556 in accordance with some implementations. The client interface server 556, typically, includes one or more processing units (CPUs) 734, one or more network interfaces 736, memory 738, and one or more communication buses 740 for interconnecting these components (sometimes called a chipset). Memory 738 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 738, optionally, includes one or more storage devices remotely located from one or more processing units 734. Memory 738, or alternatively the non-volatile memory within memory 738, includes a non-transitory computer readable storage medium. In some implementations, memory 738, or the non-transitory computer readable storage medium of memory 738, stores the following programs, modules, and data structures, or a subset or superset thereof:

Operating system 742 including procedures for handling various basic system services and for performing hardware dependent tasks;

Network communication module 744 for connecting the client interface server 556 to other systems and devices (e.g., client devices, video server 554, and systems connected to one or more networks 162, FIGS. 1-5B) via one or more network interfaces 740 (wired or wireless);

Client interface module 746, which provides an I/O interface between client devices 504 and the video server 554, including but not limited to:

Video feed module 7462 for transmitting videos from the video server system, or images extracted from same videos, to client devices as video streams or periodically refreshed images, and optionally transmitting particular views of videos or images from videos;

Transcode module 7464 for rescaling (e.g., downscaling from 720 P to 180 P) video for transmission to client devices 504;

Client input module 7466 for receiving and processing input commands from client devices (e.g., client device 504) 504 to change the video view being transmitted or controlling a video source 522;

Camera view module 7468 for determining which views of videos or images from videos are to be transmitted to client devices; and User interface module 74610 for generating user interfaces (e.g., web pages), transmitted to client devices 504, for viewing video feeds and corresponding event histories.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 738, optionally, stores a subset of the modules and data structures identified above. Furthermore, memory 738, optionally, stores additional modules and data structures not described above.

Figure 7E:
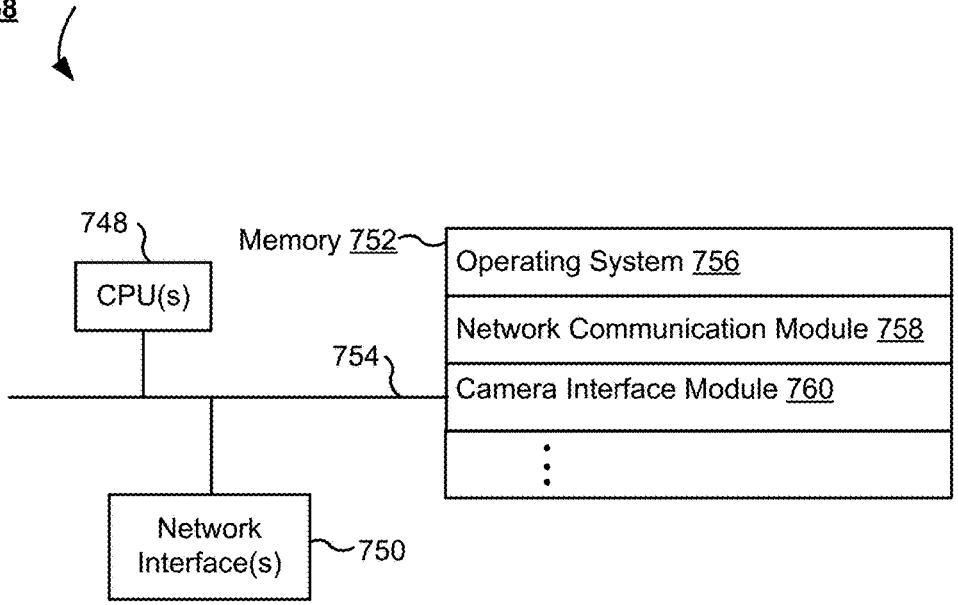
FIG. 7E is a block diagram illustrating a representative camera interface server, in accordance with some implementations.

FIG. 7E is a block diagram illustrating the camera interface server 558 in accordance with some implementations. The camera interface server 558, typically, includes one or more processing units (CPUs) 748, one or more network interfaces 750, memory 752, and one or more communication buses 754 for interconnecting these components (sometimes called a chipset). Memory 752 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 752, optionally, includes one or more storage devices remotely located from one or more processing units 748. Memory 752, or alternatively the non-volatile memory within memory 752, includes a non-transitory computer readable storage medium. In some implementations, memory 752, or the non-transitory computer readable storage medium of memory 752, stores the following programs, modules, and data structures, or a subset or superset thereof:

Operating system 756 including procedures for handling various basic system services and for performing hardware dependent tasks;

Network communication module 758 for connecting the camera interface server 558 to other systems and devices (e.g., client devices, video server 554, and systems connected to one or more networks 162, FIGS. 1-5B) via one or more network interfaces 754 (wired or wireless); and Camera interface module 760 for providing an I/O interface between video sources 522 and the video server 554.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 752, optionally, stores a subset of the modules and data structures identified above. Furthermore, memory 752, optionally, stores additional modules and data structures not described above.

In some implementations, at least some of the functions of the video server 554, client interface server 556, and camera interface server 558 are performed by the hub device server system 508, and the corresponding modules and sub-modules of these functions may be included in the hub device server system 508. In some implementations, at least some of the functions of the hub device server system 508 are performed by the video server 554, client interface server 556, and/or camera interface server 558, and the corresponding modules and sub-modules of these functions may be included in the video server 554, client interface server 556, and/or camera interface server 558.

Figure 8A:
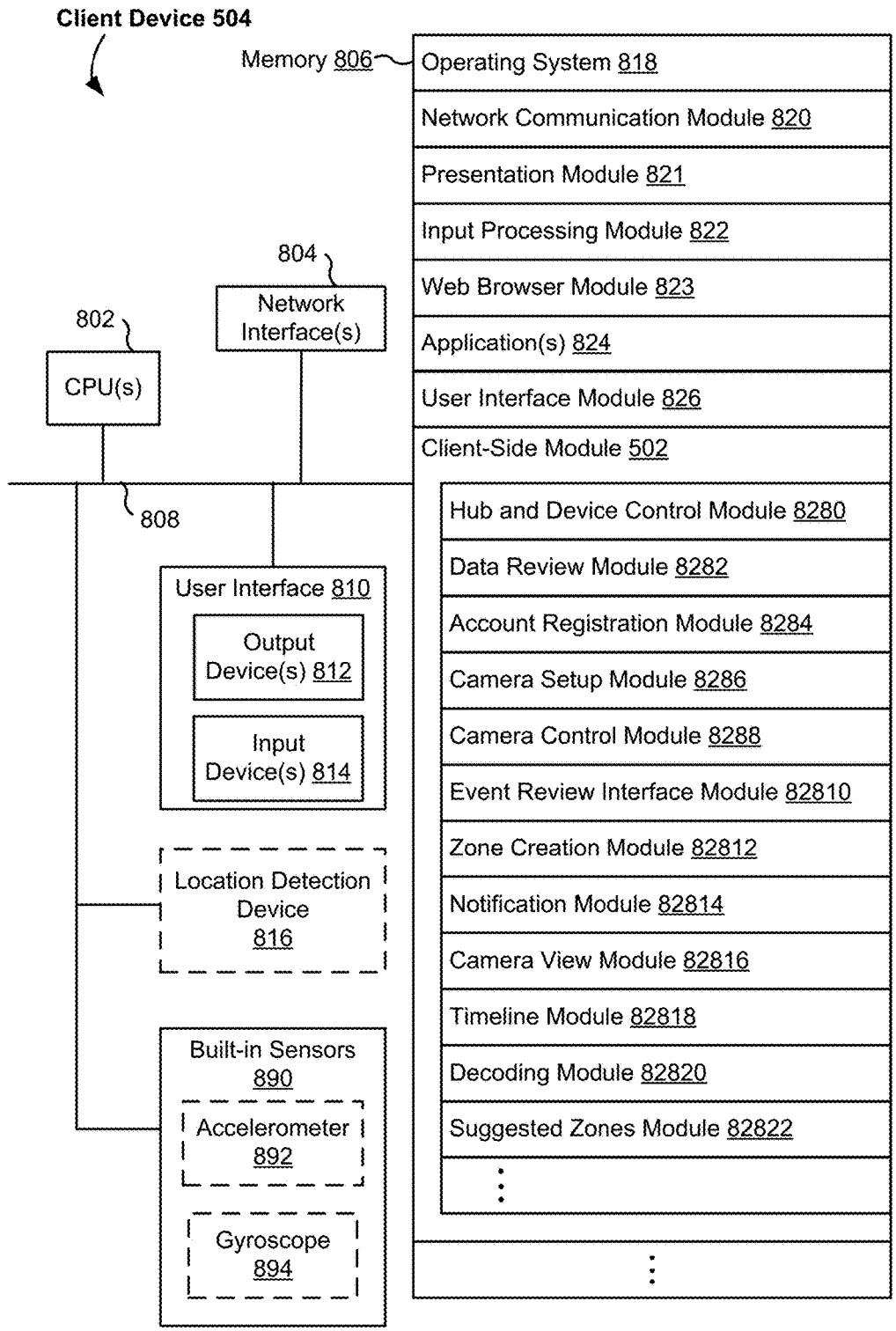
FIGS. 8A-8B are block diagrams illustrating a representative client device associated with a user account, in accordance with some implementations.
Figure 8B:
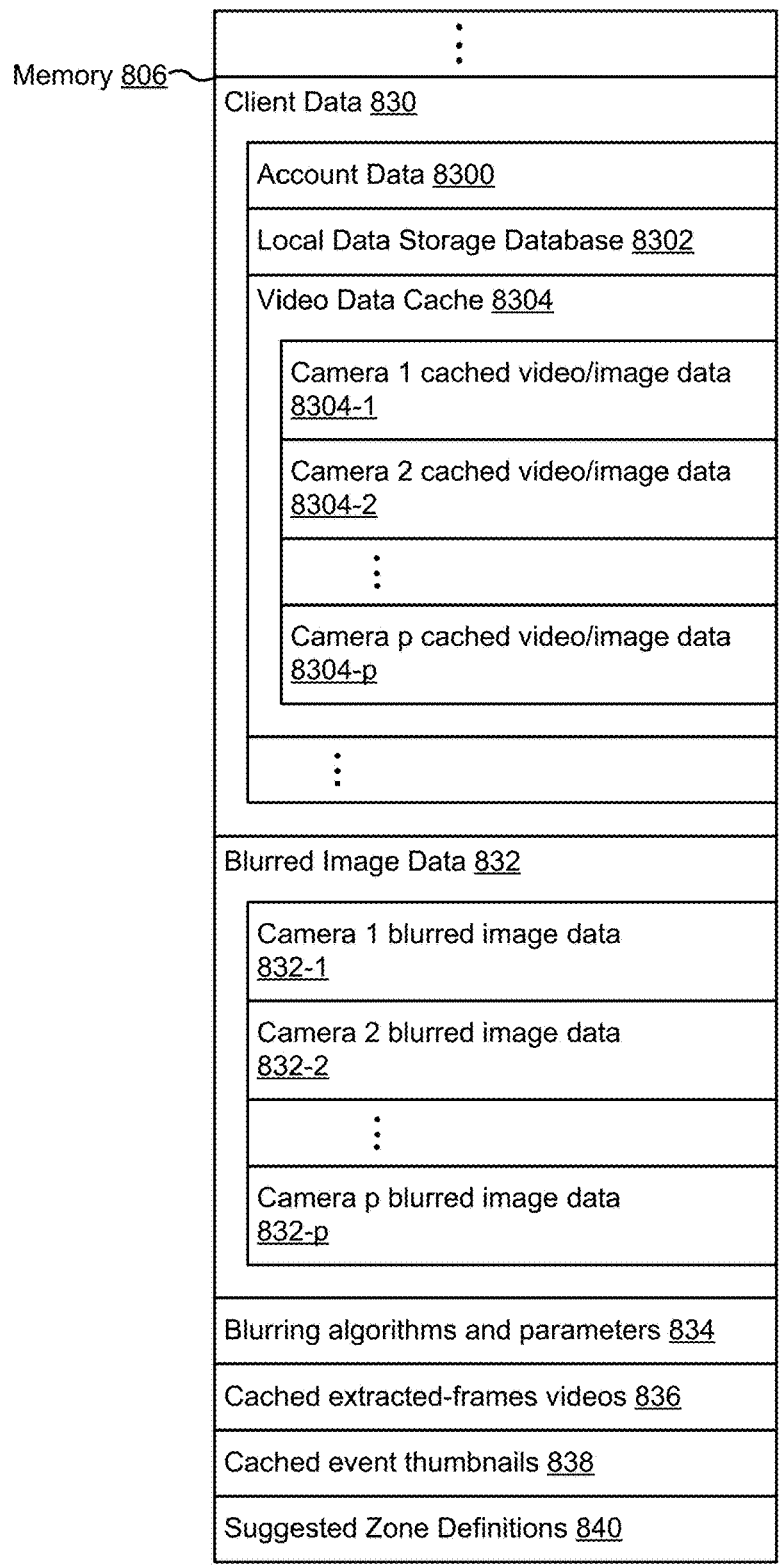

FIGS. 8A-8B are block diagrams illustrating a representative client device 504 associated with a user (e.g., reviewer) account in accordance with some implementations. The client device 504, typically, includes one or more processing units (CPUs) 802, one or more network interfaces 804, memory 806, and one or more communication buses 808 for interconnecting these components (sometimes called a chipset). The client device also includes a user interface 810 and one or more built-in sensors 890 (e.g., accelerometer 892 and gyroscope 894). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, the client device 504 optionally uses a microphone and voice recognition or a camera and gesture recognition to supplement or replace the keyboard. Further, the client device 504 optionally uses the accelerometer to detect changes in the orientation of the client device 504, and in particular applications and contexts interpret the change in orientation detected by the accelerometer as user input. In some implementations, the client device 504 includes one or more cameras, scanners, or photo sensor units for capturing images (not shown). In some implementations, the client device 504 optionally includes a location detection device 816, such as a GPS (global positioning satellite) or other geo-location receiver, for determining the location of the client device 504.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 818 including procedures for handling various basic system services and for performing hardware dependent tasks;

Network communication module 820 for connecting the client device 504 to other systems and devices (e.g., hub device server system 508, video server system 552, video sources 522) connected to one or more networks 162 via one or more network interfaces 804 (wired or wireless);

Presentation module 821 for enabling presentation of information (e.g., user interfaces for application(s) 824 and web browser module 823 or the client-side module 502, widgets, websites and web pages thereof, and/or games, audio and/or video content, text, etc.) at the client device 504 via the one or more output devices 812 (e.g., displays, speakers, etc.) associated with the user interface 810;

Input processing module 822 for detecting one or more user inputs or interactions from one of the one or more input devices 814 and optionally the accelerometer 892 and interpreting the detected input or interaction;

Web browser module 823 for navigating, requesting (e.g., via HTTP), and displaying websites and web pages thereof, including a web interface for logging into a reviewer account, controlling the video sources associated with the reviewer account, establishing and selecting event filters, and editing and reviewing motion events detected in the video streams of the video sources;

One or more applications 824 for execution by the client device 504 (e.g., games, social network applications, smart home applications, and/or other web or non-web based applications), for controlling devices (e.g., sending commands, configuring settings, etc. to hub devices and/or other client or electronic devices), and for reviewing data captured by the devices (e.g., device status and settings, captured data, or other information regarding the hub device or other connected devices);

User interface module 826 for providing and displaying a user interface in which settings, captured data, and/or other data for one or more devices (e.g., smart devices 204 in smart home environment 100) can be configured and/or viewed;

Client-side module 502, which provides client-side data processing and functionalities for device control, data processing, data review, and monitoring and reviewing videos from one or more video sources and camera events, including but not limited to:

Hub device and device control module 8280 for generating control commands for modifying an operating mode of the hub device or the electronic devices in accordance with user inputs; and Data review module 8282 for providing user interfaces for reviewing data processed by the hub device server system 508 or video server system 552;

Account registration module 8284 for establishing a reviewer account and registering one or more video sources with the hub device server system 508 or video server system 552;

Camera setup module 8286 for setting up one or more video sources within a local area network, and enabling the one or more video sources to access the hub device server system 508 or video server system 552 on the Internet through the local area network;

Camera control module 8288 for generating control commands for modifying an operating mode of the one or more video sources in accordance with user input;

Event review interface module 82810 for providing user interfaces for reviewing event timelines, camera histories with camera events, editing event categorization results, selecting event filters, presenting real-time filtered motion events based on existing and newly created event filters (e.g., event categories, zones of interest, a human filter, etc.), presenting real-time notifications (e.g., pop-ups) for newly detected motion events, and presenting smart time-lapse of selected motion events;

Zone creation module 82814 for providing a user interface for creating zones of interest for each video stream in accordance with user input, and sending the definitions of the zones of interest to the hub device server system 508 or video server system 552;

Notification module 82814 for generating real-time notifications for all or selected alert events or motion events on the client device 504 outside of the event review user interface;

Camera view module 82816 for generating control commands for modifying a view of a video transmitted to the client device 504 in accordance with user input;

Timeline module 82818 for presenting information corresponding to video transmitted to the client device 504 in a timeline format, facilitating user manipulation of the information displayed in timeline format, and facilitating manipulation of display of the video in accordance with user manipulation of the information, including requesting additional video from the hub device server system 508 or video server system 552 in accordance with the user manipulation;

Decoding module 82820 for decoding extracted-frames video; and

Suggested zones module 82822 for presenting suggested zone definitions and associated events and processing user interaction with suggested zone definitions; and Client data 830 storing data associated with the user account, electronic devices, and video sources 522, including, but is not limited to:

Account data 8300 storing information related to both user accounts loaded on the client device 504 and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc., Local data storage database 8302 for selectively storing raw or processed data associated with electronic devices (e.g., of the video sources 522, such as a camera 118); and Video data cache 8304 for caching video and image data from video feeds;

Blurred image data 832;

Blurring algorithms and parameters 834, for generating blurred image data 832 from video/image data in video data cache 8304;

Cached extracted-frames videos 836 for storing or caching extracted-frames videos received from the video server 554;

Cached event thumbnails 838 for storing or caching event thumbnails received from the video server 554; and Suggested zone definitions 840 for storing suggested zone definitions.

Video data cache 8304 includes cached video/image data for respective cameras associated with a user of the client device 804. For example, as shown in FIG. 8B, the video data cache 8304 includes cached video/image data 8304-1 for a first camera, cached video/image data 8304-2 for a second camera, up to cached video/image data 8304-$p$ for a p-th camera. At a given moment, video data cache 8304 may not have cached video/image data for a given camera (e.g., due to the camera being newly associated with the user, due to the cache being cleared, due to the cached video/image data being expired and removed from the cache).

Blurred image data 832 includes sets of progressively blurred images for respective cameras. For example, as shown in FIG. 8B, the blurred image data 832 includes blurred image data (e.g., a set of progressively blurred images) 832-1 for the first camera, blurred image data 832-2 for the second camera, up to blurred image data 832-$p$ for the p-th camera.

In some implementations, the client device 504 caches camera history as well as video data 8304. For example, whenever the client device 504 receives camera events history 7328 data from the video server 554, the most recent camera events history (e.g., history from the past two hours, the most recent 20 events) is cached at the client device (e.g., in client data 830). This cached history data may be accessed for quick display of camera history information.

In some implementations, the client-side module 502 and user interface module 826 are parts, modules, or components of a particular application 824 (e.g., a smart home management application).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, at least some of the functions of the hub device server system 508 or the video server system 552 are performed by the client device 504, and the corresponding sub-modules of these functions may be located within the client device 504 rather than the hub device server system 508 or video server system 552. In some implementations, at least some of the functions of the client device 504 are performed by the hub device server system 508 or video server system 552, and the corresponding sub-modules of these functions may be located within the hub device server system 508 or video server system 552 rather than the client device 504. The client device 504 and the hub device server system 508 or video server system 552 shown in FIGS. 7A-8, respectively, are merely illustrative, and different configurations of the modules for implementing the functions described herein are possible in various implementations.

Figure 9A:
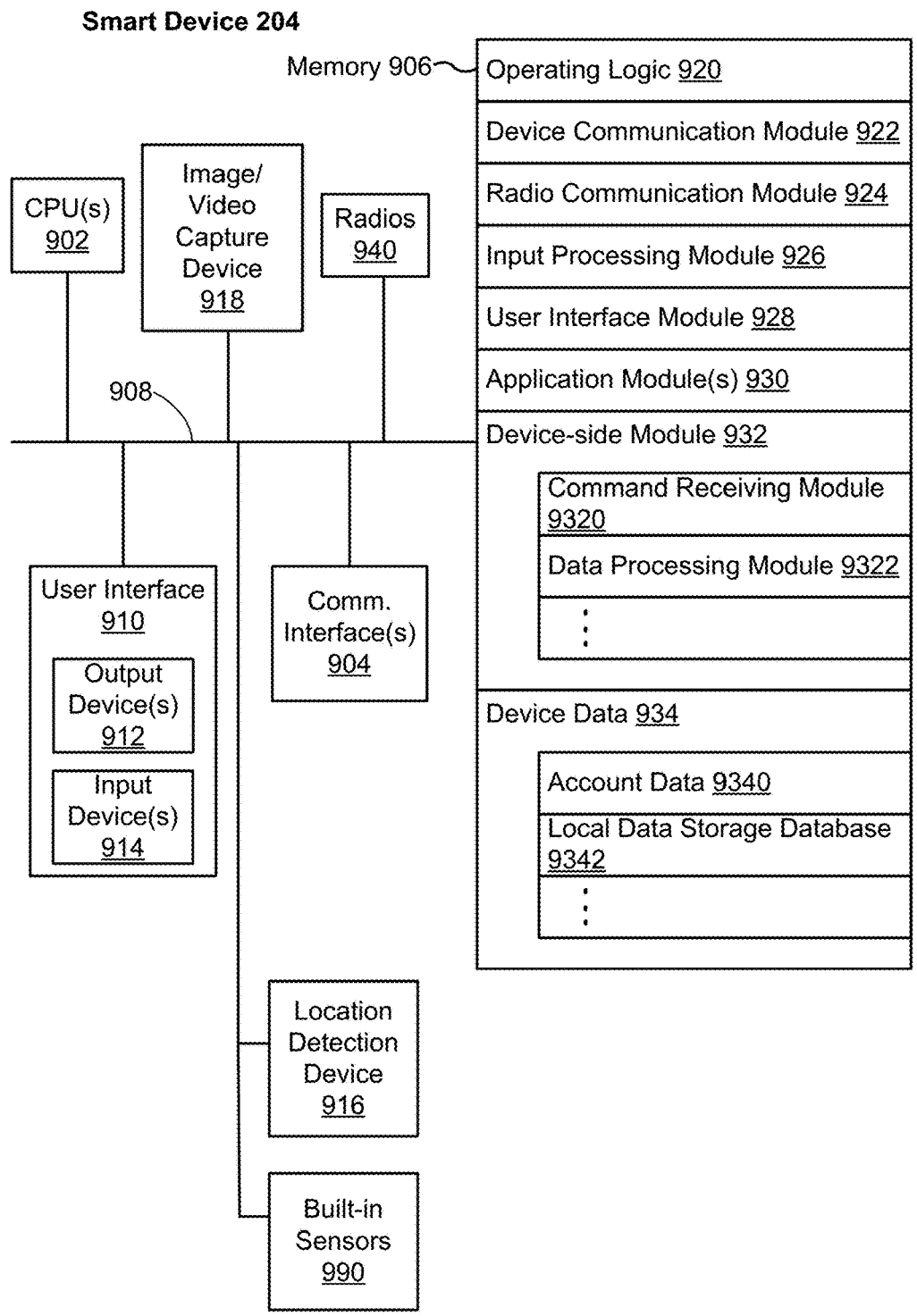
FIG. 9A is a block diagram illustrating a representative smart device, in accordance with some implementations.

FIG. 9A is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICs, FPGAs, microprocessors, and the like) 902, one or more communication interfaces 904, memory 906, radios 940, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 940 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 904 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

- Operating logic 920 including procedures for handling various basic system services and for performing hardware dependent tasks;
- Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);
- Radio Communication Module 924 for connecting the smart device 204 to other devices (e.g., controller devices, smart devices 204 in smart home environment 100, client devices 504) via one or more radio communication devices (e.g., radios 940)
- Input processing module 926 for detecting one or more user inputs or interactions from the one or more input devices 914 and interpreting the detected inputs or interactions;
- User interface module 928 for providing and displaying a user interface in which settings, captured data, and/or other data for one or more devices (e.g., the smart device 204, and/or other devices in smart home environment 100) can be configured and/or viewed;
- One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- Device-side module 932, which provides device-side functionalities for device control, data processing and data review, including but not limited to:
  - Command receiving module 9320 for receiving, forwarding, and/or executing instructions and control commands (e.g., from a client device 504, from a smart home provider server system 164, from user inputs detected on the user interface 910, etc.) for operating the smart device 204;
  - Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user); and
- Device data 934 storing data associated with devices (e.g., the smart device 204), including, but is not limited to:
  - Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and Local data storage database 9342 for selectively storing raw or processed data associated with the smart device 204 (e.g., video surveillance footage captured by a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

Figure 9B:
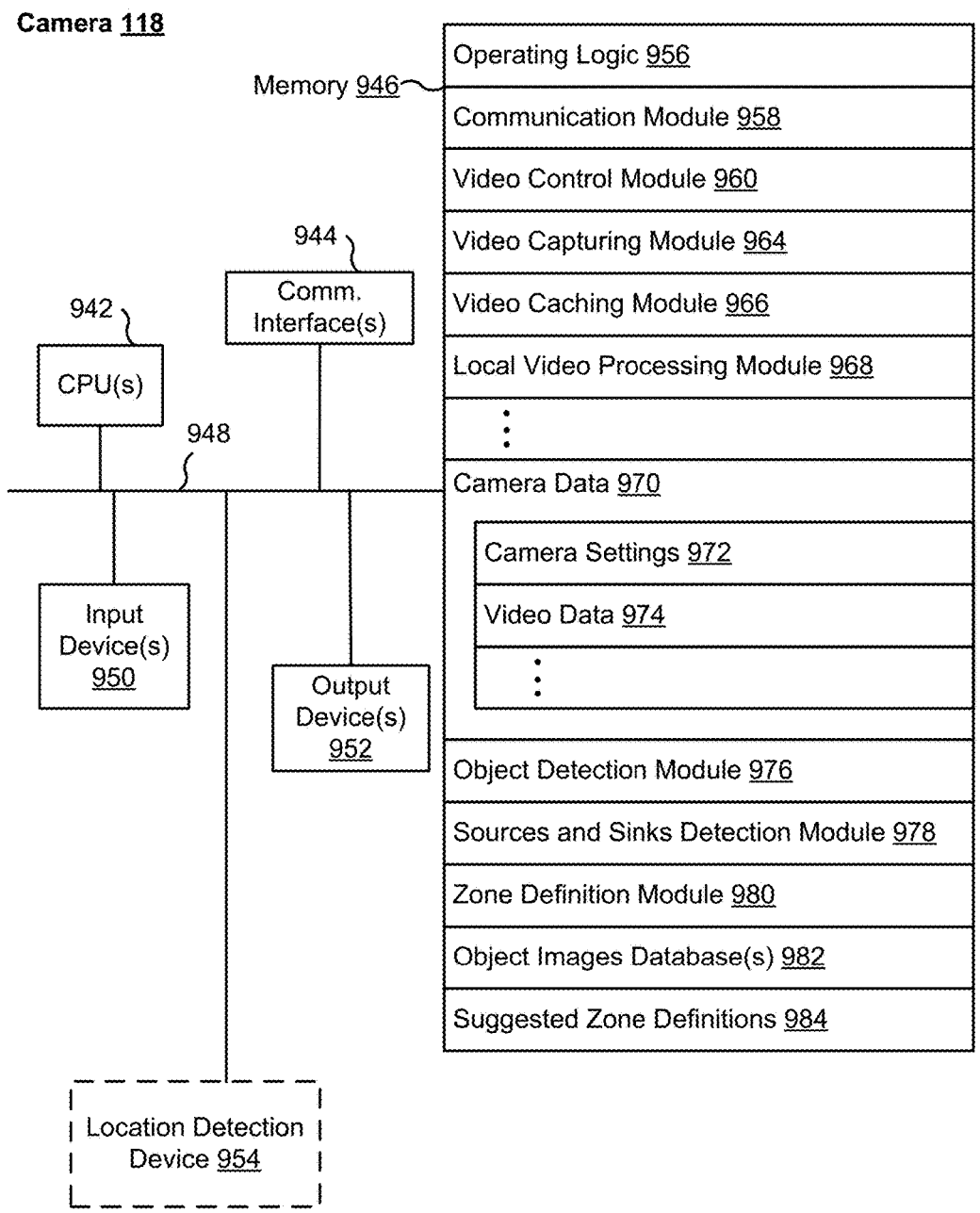
FIG. 9B is a block diagram illustrating a representative video capturing device (e.g., a camera) in accordance with some implementations.

FIG. 9B is a block diagram illustrating a representative camera 118 in accordance with some implementations. In some implementations, the camera 118 includes one or more processing units (e.g., CPUs, ASICs, FPGAs, microprocessors, and the like) 942, one or more communication interfaces 944, memory 946, and one or more communication buses 948 for interconnecting these components (sometimes called a chipset). In some implementations, the camera 118 includes one or more input devices 950 such as one or more buttons for receiving input and one or more microphones. In some implementations, the camera 118 includes one or more output devices 952 such as one or more indicator lights, a sound card, a speaker, a small display for displaying textual information and error codes, playing audio, etc. In some implementations, the camera 118 optionally includes a location detection device 954, such as a GPS (global positioning satellite) or other geo-location receiver, for determining the location of the camera 118.

Communication interfaces 944 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 946 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 946, or alternatively the non-volatile memory within memory 946, includes a non-transitory computer readable storage medium. In some implementations, memory 946, or the non-transitory computer readable storage medium of memory 946, stores the following programs, modules, and data structures, or a subset or superset thereof:

Operating system 956 including procedures for handling various basic system services and for performing hardware dependent tasks;

Network communication module 958 for connecting the camera 118 to other computing devices (e.g., hub device server system 508, video server system 552, the client device 504, network routing devices, one or more controller devices, and networked storage devices) connected to the one or more networks 162 via the one or more communication interfaces 944 (wired or wireless);

Video control module 960 for modifying the operation mode (e.g., zoom level, resolution, frame rate, recording and playback volume, lighting adjustment, AE and IR modes, etc.) of the camera 118, enabling/disabling the audio and/or video recording functions of the camera 118, changing the pan and tilt angles of the camera 118, resetting the camera 118, and/or the like;

Video capturing module 964 for capturing and generating a video stream and sending the video stream to the hub device server system 508 or video server system 552 as a continuous feed or in short bursts, and optionally generating a rescaled version of the video stream and sending the video stream at the original captured resolution and the rescaled resolution;

Video caching module 966 for storing some or all captured video data locally at one or more local storage devices (e.g., memory, flash drives, internal hard disks, portable disks, etc.);

Local video processing module 968 for performing preliminary processing of the captured video data locally at the camera 118, including for example, compressing and encrypting the captured video data for network transmission, preliminary motion event detection, preliminary false positive suppression for motion event detection, preliminary motion vector generation, etc.; and Camera data 970 storing data, including but not limited to:
Camera settings 972, including network settings, camera operation settings, camera storage settings, etc.; and
Video data 974, including video segments and motion vectors for detected motion event candidates to be sent to the hub device server system 508 or video server system 552;

Object detection module 976 for detecting objects and corresponding contours in video feeds;

Sources and sinks detection module 978 for detecting sources and sinks of motion activity in video feeds;

Zone definition module 980 for generating suggested zone definitions for detected objects;

Object images database(s) 982 for storing one or more databases (e.g., machine-trained databases) of images of objects; and Suggested zone definitions 984 for storing suggested zone definitions.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 946, optionally, stores a subset of the modules and data structures identified above. Furthermore, memory 946, optionally, stores additional modules and data structures not described above. Additionally, camera 118, being an example of a smart device 204, optionally includes components and modules included in smart device 204 as shown in FIG. 9A that are not shown in FIG. 9B.

Figure 10:
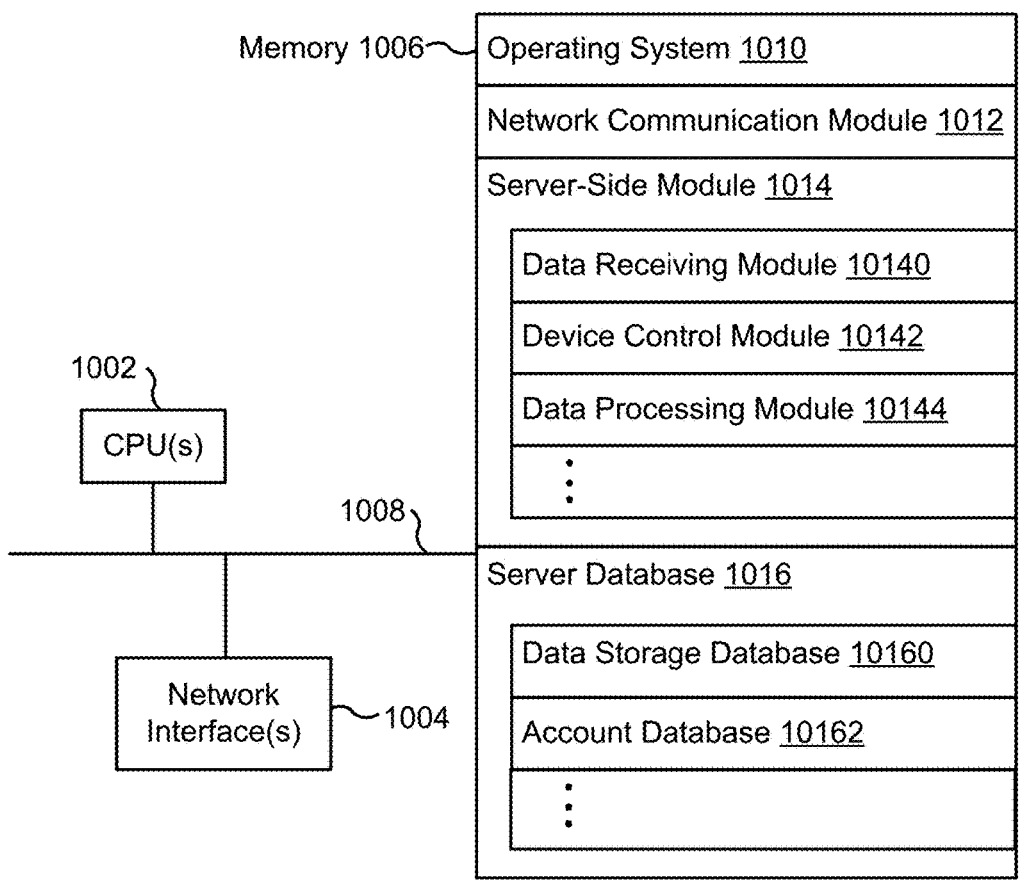
FIG. 10 is a block diagram illustrating a representative smart home provider server system, in accordance with some implementations.

FIG. 10 is a block diagram illustrating the smart home provider server system 164 in accordance with some implementations. The smart home provider server system 164, typically, includes one or more processing units (CPUs)

1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

- Operating system 1010 including procedures for handling various basic system services and for performing hardware dependent tasks;
- Network communication module 1012 for connecting the smart home provider server system 164 to other systems and devices (e.g., client devices, electronic devices, hub device server system 508, video server system 552, and systems connected to one or more networks 162, FIGS. 1-5B) via one or more network interfaces 1004 (wired or wireless);
- Server-side module 1014, which provides server-side functionalities for device control, data processing and data review, including but not limited to:
  - Data receiving module 10140 for receiving data from electronic devices (e.g., video data from a camera 118, FIG. 1), and preparing the received data for further processing and storage in the data storage database 10160;
  - Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;
  - Data processing module 10144 for processing the data provided by the electronic devices, and/or preparing and sending processed data to a device for review (e.g., client devices 504 for review by a user); and
- Server database 1016, including but not limited to:
  - Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and
  - Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, hub device server system 508, video server system 552, client device 504, smart device 204, camera 118, smart home provider server system 164) are interchangeable with one another and may be performed by any other devices or systems, where the corresponding sub-modules of these functions may additionally and/or alternatively be located within and executed by any of the devices and systems. As one example, generating of user interfaces may be performed by the user interface module 74610 (which may be located at the client interface server 556 or at the video server 554) or by the user interface module 826, depending on whether the user is accessing the video feeds and corresponding histories through a web browser 823 or an application 824 (e.g., a dedicated smart home management application) at the client device 504. The devices and systems shown in and described with respect to FIGS. 6-10 are merely illustrative, and different configurations of the modules for implementing the functions described herein are possible in various implementations.

Figure 11A:
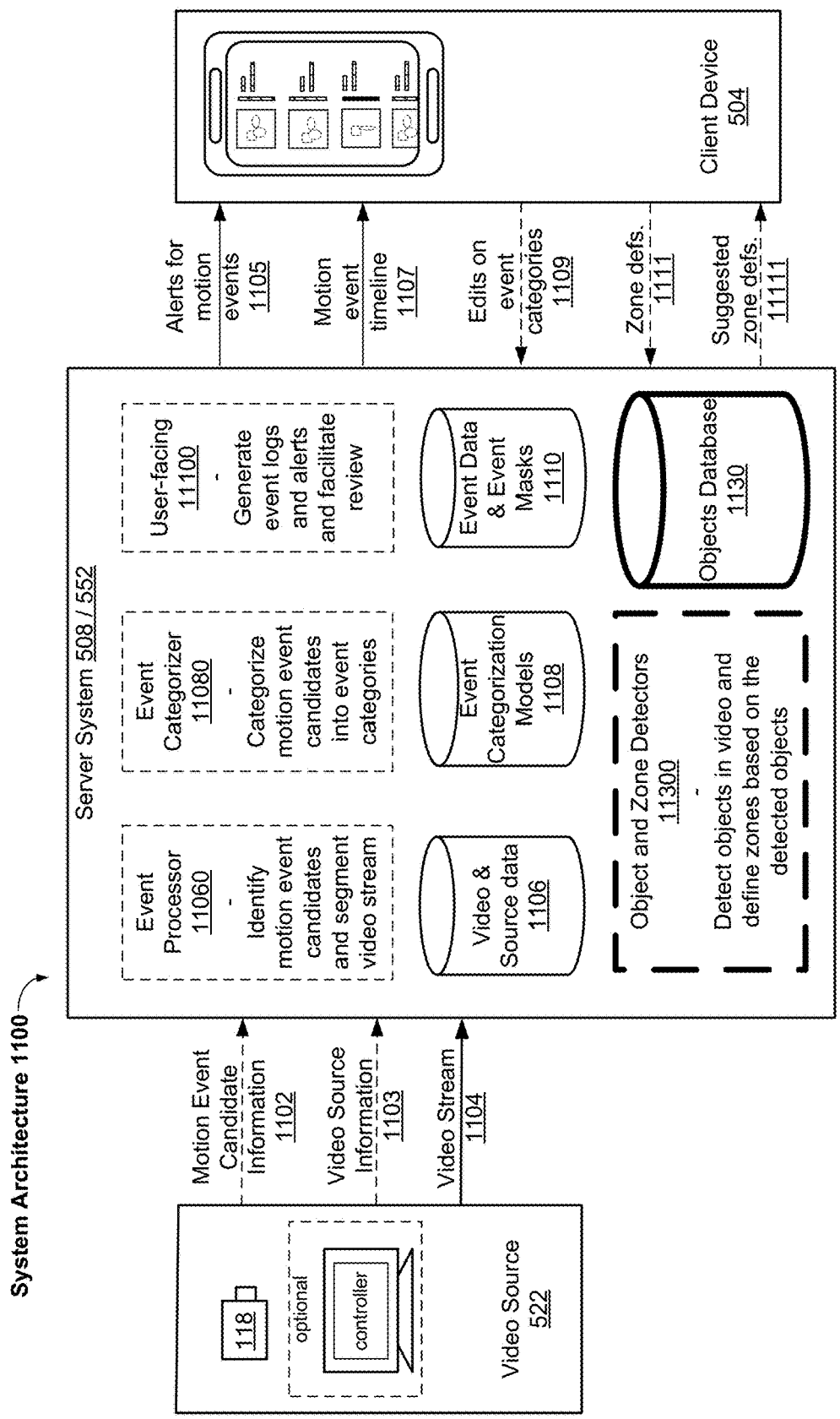
FIG. 11A illustrates a representative system architecture, in accordance with some implementations.
Figure 11B:
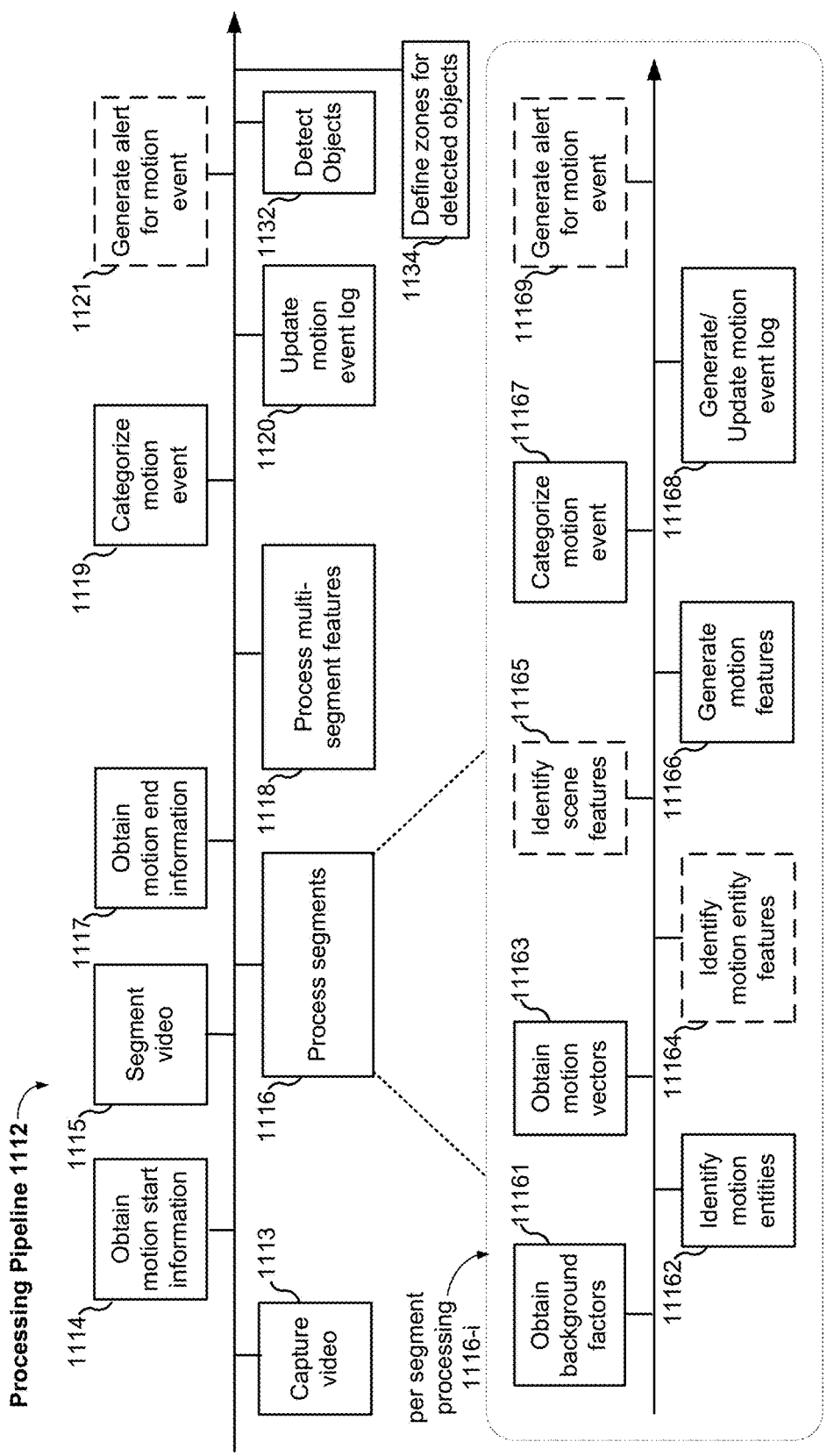
FIG. 11B illustrates a representative processing pipeline, in accordance with some implementations.

FIG. 11A illustrates a representative system architecture 1100 and FIG. 11B illustrates a corresponding data processing pipeline 1112.

In some implementations, the server system 508 or 552 includes functional modules for an event processor 11060, an event categorizer 11080, and a user-facing frontend 11100. The event processor 11060 (e.g., event detection module 7306, FIG. 7B) obtains the motion event candidates (e.g., by processing the video stream or by receiving the motion start information from the video source 522). The event categorizer 11080 (e.g., event categorization module 7308, FIG. 7B) categorizes the motion event candidates into different event categories. The user-facing frontend 11100 (e.g., alert events module 73022, FIG. 7B) generates event alerts and facilitates review of the motion events by a reviewer through a review interface on a client device 504. The user-facing frontend 11100 also receives user edits on the event categories, user preferences for alerts and event filters, and zone definitions for zones of interest. The event categorizer optionally revises event categorization models and results based on the user edits received by the user-facing frontend. The server system 508/552 also includes a video and source data database 1106, event categorization modules database 1108, and event data and event masks database 1110. In some implementations, each of these databases is part of the server database 732.

In some implementations, the server system 508/552 also includes object and zone detectors 11300. The object and zone detectors (e.g., object detection module 73032, sources and sinks detection module 73034, zone definition module 73036; FIG. 7B) detects objects in scenes captured on video (e.g., video stream 1104), determines if the detected objects are associated with motion activity (e.g., determine if an object is associated with a motion activity source or sink), and generates suggested zone definitions for the detected objects. In some implementations, object detection includes comparing imagery (e.g., frames) from the video to one or more objects databases 1130 (e.g., object images database(s) 734) to identify defined objects (e.g., door, chair, couch, window, etc.) in the video. The objects databases 1130 include a collection of images of known objects. In some implementations, the objects databases are machine-trained. In some implementations, there are object databases for different types of objects (e.g., a database of images of doors, another one for windows, yet another one for couches, etc.).

In some implementations, the server system 508/552 also includes a frame extractor and encoder (not shown). The frame extractor and encoder (e.g., frame extraction module 73026, encoding module 73028; FIG. 7B) extracts frames from raw video (e.g., video stream 1104) and encodes the extracted frames into an extracted-frames video. In some implementations, the frame extractor and encoder extract frames at a predefined rate or a lower rate for portions of the video stream without alert events, and extracts frames at a higher rate for portions with alert events (e.g., the portion with the alert event and bracketing portions before and after the portion with the alert event). In some implementations, the overall, average rate at which the frames are extracted is a predefined rate (e.g., 20 frames per 20 minutes, 60 frames per hour, 1 frame per minute). The server system 508/552 also includes an extracted frames and extracted-frames videos database. In some implementations, extracted frames and extracted-frames videos are part of the server database 732 (e.g., extracted frames and extracted-frames videos database 7330, FIG. 7C).

The server system 508/552 receives the video stream 1104 from the video source 522 and optionally receives motion event candidate information 1102 such as motion start information and video source information 1103 such as device settings for camera 118. In some implementations, the event processor sub-module 11060 communicates with the video source 522. The server system sends alerts for motion (and other) events 1105 and event timeline information 1107 to the client device 504. The server system 508/552 optionally receives user information from the client device 504 such as edits on event categories 1109 and zone definitions 1111. The server system also sends to the client device 504 video 1136 (which may be the video stream 1104 or a modified version thereof) and, on request by the client device 504, extracted-frames video 1138. Further, in some implementations, the server system also sends to the client device 504 suggested zone definitions 11111 for detected objects, and receives from the client device user interaction with the suggested zone definitions (e.g., acceptance or rejection of a suggested definition, request for information for a suggested definition).

The data processing pipeline 1112 processes a live video feed received from a video source 522 (e.g., including a camera 118 and an optional controller device) in real-time to identify and categorize motion events in the live video feed, and sends real-time event alerts and a refreshed event timeline to a client device 504 associated with a reviewer account bound to the video source 522. The data processing pipeline 1112 also processes stored video feeds from a video source 522 to reevaluate and/or re-categorize motion events as necessary, such as when new information is obtained regarding the motion event and/or when new information is obtained regarding motion event categories (e.g., a new activity zone is obtained from the user).

After video data is captured at the video source 522 (1113), the video data is processed to determine if any potential motion event candidates are present in the video stream. A potential motion event candidate detected in the video data is also sometimes referred to as a cuepoint. Thus, the initial detection of a motion event candidate is referred to as motion start detection and/or cuepoint detection. Motion start detection (1114) triggers performance of a more thorough event identification process on a video segment (also sometimes called a "video slice" or "slice") corresponding to the motion event candidate. In some implementations, the video data is initially processed at the video source 522. Thus, in some implementations, the video source sends motion event candidate information, such as motion start information, to the server system 508. In some implementations, the video data is processed at the server system 508 for motion start detection. In some implementations, the video stream is stored on server system 508 (e.g., in video and source data database 1106). In some implementations, the video stream is stored on a server distinct from server system 508. In some implementations, after a cuepoint is detected, the relevant portion of the video stream is retrieved from storage (e.g., from video and source data database 1106).

In some implementations, the more thorough event identification process includes segmenting (1115) the video stream into multiple segments then categorizing the motion event candidate within each segment (1116). In some implementations, categorizing the motion event candidate includes an aggregation of background factors, motion entity detection identification, motion vector generation for each motion entity, motion entity features, and scene features to generate motion features (11166) for the motion event candidate. In some implementations, the more thorough event identification process further includes categorizing each segment (11167), generating or updating a motion event log (11168) based on categorization of a segment, generating an alert for the motion event (11169) based on categorization of a segment, categorizing the complete motion event (1119), updating the motion event log (1120) based on the complete motion event, and generating an alert for the motion event (1121) based on the complete motion event. In some implementations, a categorization is based on a determination that the motion event candidate is within a particular zone of interest. In some implementations, a categorization is based on a determination that the motion event candidate involves one or more particular zones of interest.

In some implementations, one or more objects are detected in the video (1132), and one or more suggested zones are defined for at least some of the detected objects (1134). Image analysis may be performed on images from the video (e.g., frames of the video) to detect one or more objects. Also, the detected motion events may be analyzed and compared to the video to identify source areas and sink areas in the scene depicted in the video. The sources and sinks information may be used as an input into the object detection (e.g., for narrow down the area of object detection in the video), and/or as an input into the suggested zone definition process (e.g., for selecting which object gets a suggested zone definition). The suggested zones may be presented to the user at the client device.

In some implementations, frames are extracted from the video and an extracted-frames video is encoded from the extracted frames. In some implementations, more frames are extracted per unit time of video from portions of the video during and proximate to the start and end of alert events (e.g., proximate to cuepoints) than from portions of the video without alert events. Thus, portions of the extracted-frames video without alert events have less frames per unit time than portions of the extracted-frames video with alert events.

The event analysis and categorization process may be performed by the video source 522 and the server system 508/552 cooperatively, and the division of the tasks may vary in different implementations, for different equipment capability configurations, and/or for different network and server load situations. After the server system 508 categorizes the motion event candidate, the result of the event detection and categorization may be sent to a reviewer associated with the video source 522.

In some implementations, the server system 508/552 also determines an event mask for each motion event candidate and caches the event mask for later use in event retrieval based on selected zone(s) of interest.

In some implementations, the server system 508/552 stores raw or compressed video data (e.g., in a video and source data database 1106), event categorization models (e.g., in an event categorization model database 1108), and event masks and other event metadata (e.g., in an event data and event mask database 1110) for each of the video sources 522. In some implementations, the video data is stored at one or more display resolutions such as 480p, 780p, 1080i, 1080p, and the like. In some implementations, the server system 508/552 also stores the extracted-frames video in the same or a similar database (e.g., in an extracted frames and extracted-frames video database 1130).

It should be appreciated that while the description of FIGS. 11A-11B refer to motion events, the system architecture 1100 and the data processing pipeline 1112 apply similarly to other types of events or alerts (e.g., alerts or events from other smart devices 204, such as hazard alerts). Indeed, such alerts and events may be processed together alongside motion events in the same system architecture 1100 and pipeline 1112.

In some implementations, one or more of the modules and data stores associated with server system 508 or 552 (FIGS. 5A-5B) may be located in the camera (e.g., camera 118) itself and/or in a computing device or system local to the camera (e.g., a server or digital video recorder device or hub device (e.g., hub device 180) located in the same house as the camera 118). In some implementations, one or more of the operations that are described as being performed at or by the server system 508 or 552 may be performed by the camera itself and/or by the computing device or system local to the camera. For example, the camera and/or the local device/system may include analogous modules and data stores for processing the video feed captured by the camera to detect objects (e.g., object detection module 73032 or 976), to identify sources and sinks (sources and sinks detection module 73034 or 978), and to generate suggested zone definitions for detected objects (e.g., zone definition module 73936 or 980).

EXAMPLE USER INTERFACES

Figure 12A:
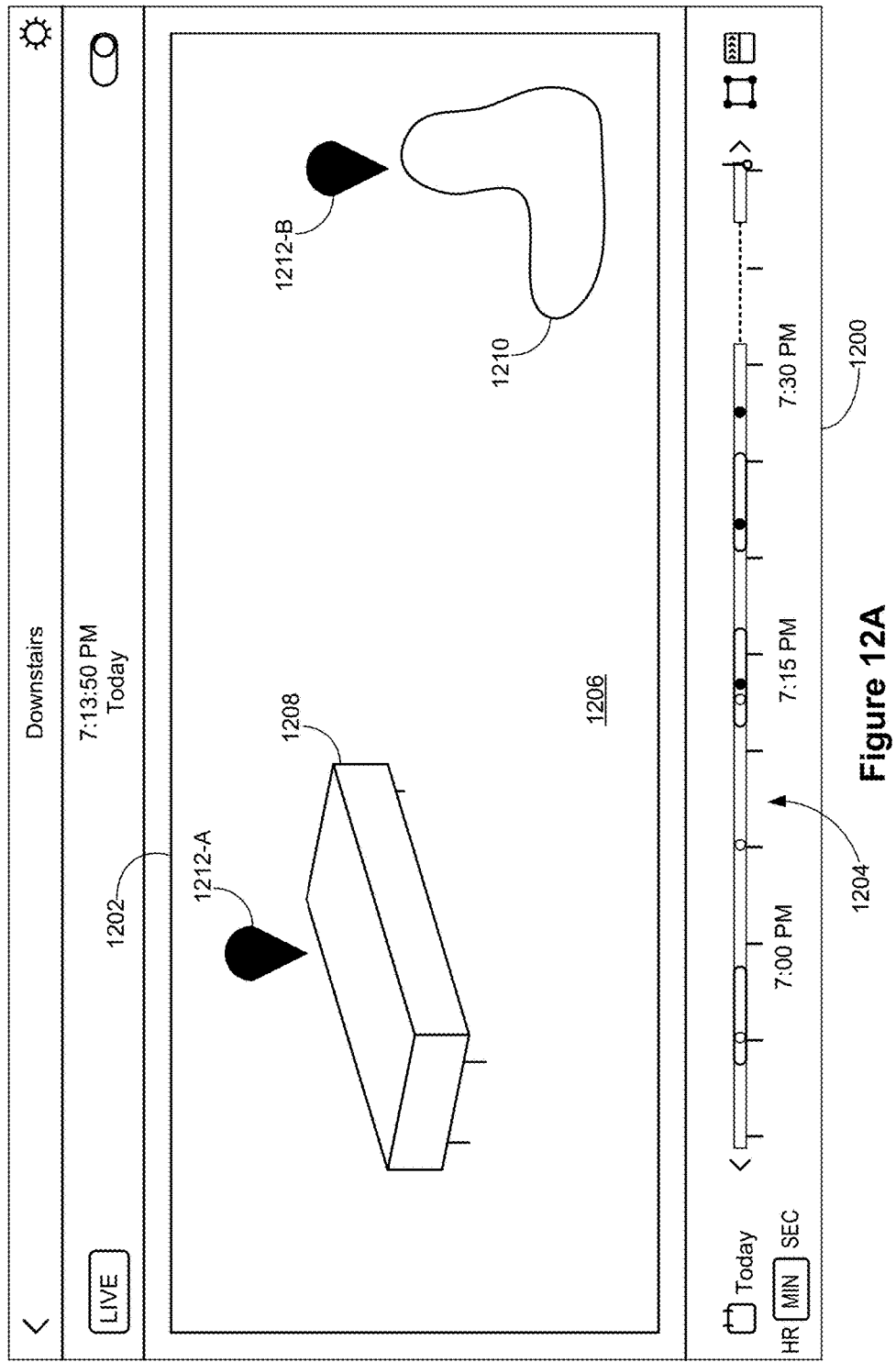
FIGS. 12A-12E illustrate example user interfaces on a client device for presenting suggested zones in accordance with some implementations.

FIGS. 12A-12E illustrate example user interfaces on a client device for presenting suggested zones in accordance with some implementations. FIG. 12A illustrates a user interface 1200. In some implementations, the user interface 1200 is displayed on a client device 504 (e.g., a mobile device, a desktop computer, a laptop computer). In some implementations, user interface 1200 is a user interface of an application (e.g., application 824 corresponding to client-side module 502) that is a dedicated smart home management application (also referred to below as a "smart home application"). In some implementations, user interface 1200 is a user interface of a smart home management website, where the user interface 1200 is displayed in a web browser application on the client device 504. For ease of understanding, user interface 1200 is described below as being displayed in a web browser application on a desktop or laptop computer with a mouse or similar pointing device for controlling, among other things, a mouse pointer.

User interface 1200 includes a video region 1202 and a timeline 1204. It should be appreciated that user interface 1200 may include additional components or elements not shown or called out in the figure.

Video region 1202 is an area or region of the user interface 1200 where video is displayed. The video displayed in the video region 1202 is live (e.g., streaming) or previously recorded video transmitted from server 508 or 552 to the client device 504. The video transmitted from the server 508 or 552 is originally captured by a camera 118, processed by and/or stored at server 508 or 552, and received from the server 508 or 552 by the client device 504.

The timeline 1204 indicates availability of recorded video and detected events for a camera 118. The timeline 1204 includes elements that indicate that video was captured by camera 118 and stored at server 508 or 552 (and available for viewing), with absence of the element in a time span indicating that video was not stored for the time span (e.g., because camera 118 was turned off, because the camera 118's network connectivity failed). The timeline 1204 also shows, for spans of time for which video was captured and stored, events detected in the captured video.

Figure 12B:
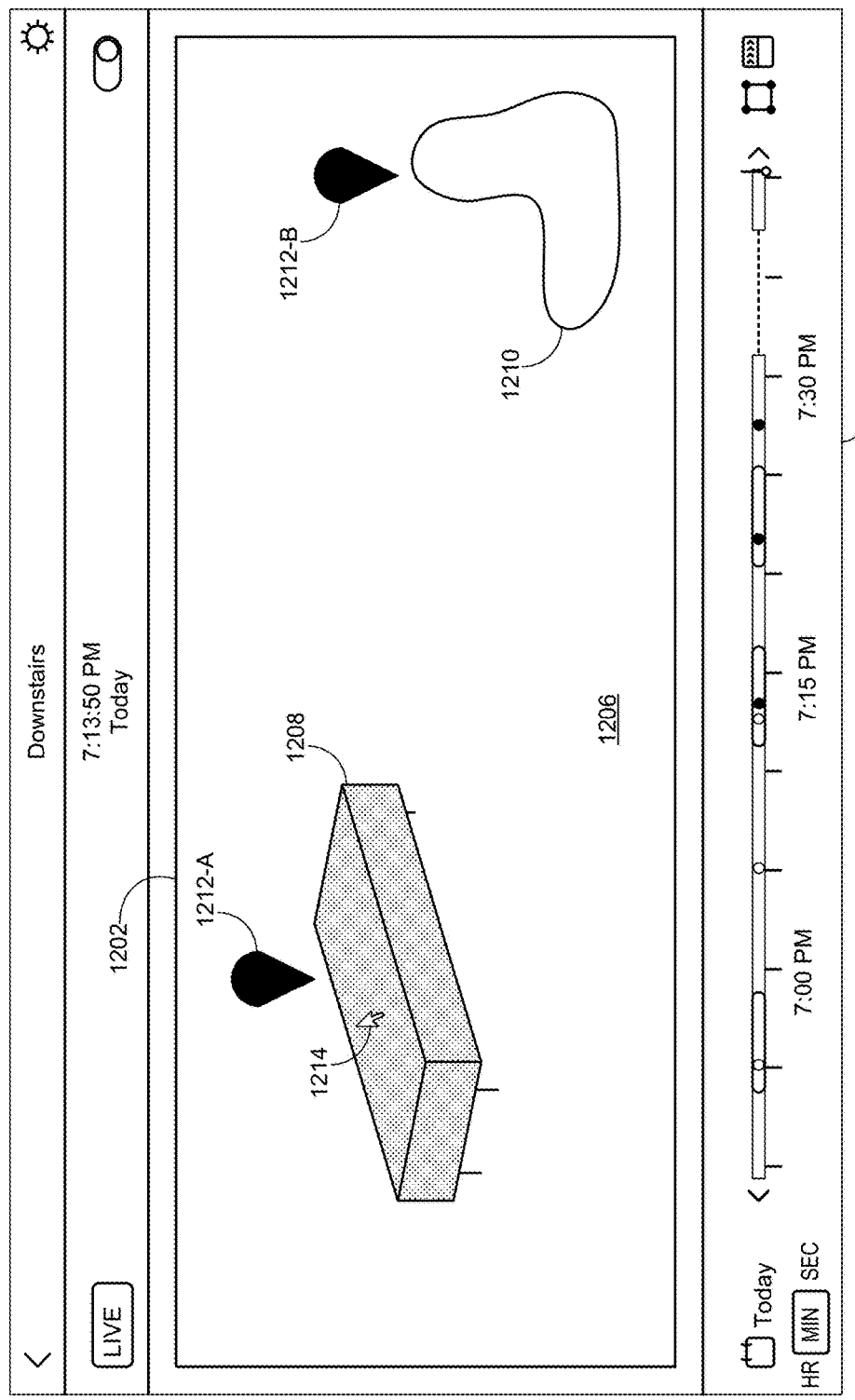

Video displayed in the video region 1202 depicts a scene 1206 that includes one or more objects (e.g., objects 1208, 1210) detected by the server 508/552 or by the camera 118, and for which a suggested zone has been defined. These objects with suggested zone definitions are marked with object markers 1212 (e.g., markers 1212-A and 1212-B) in order to call them out to a user viewing the video. A user may hover a mouse pointer 1214 over a marked object, such as object 1208, as shown in FIG. 12B. When the mouse pointer hovers over object 1208, the object 1208 is displayed with highlighting (e.g., different shading, thicker borders, different color).

Figure 12C:
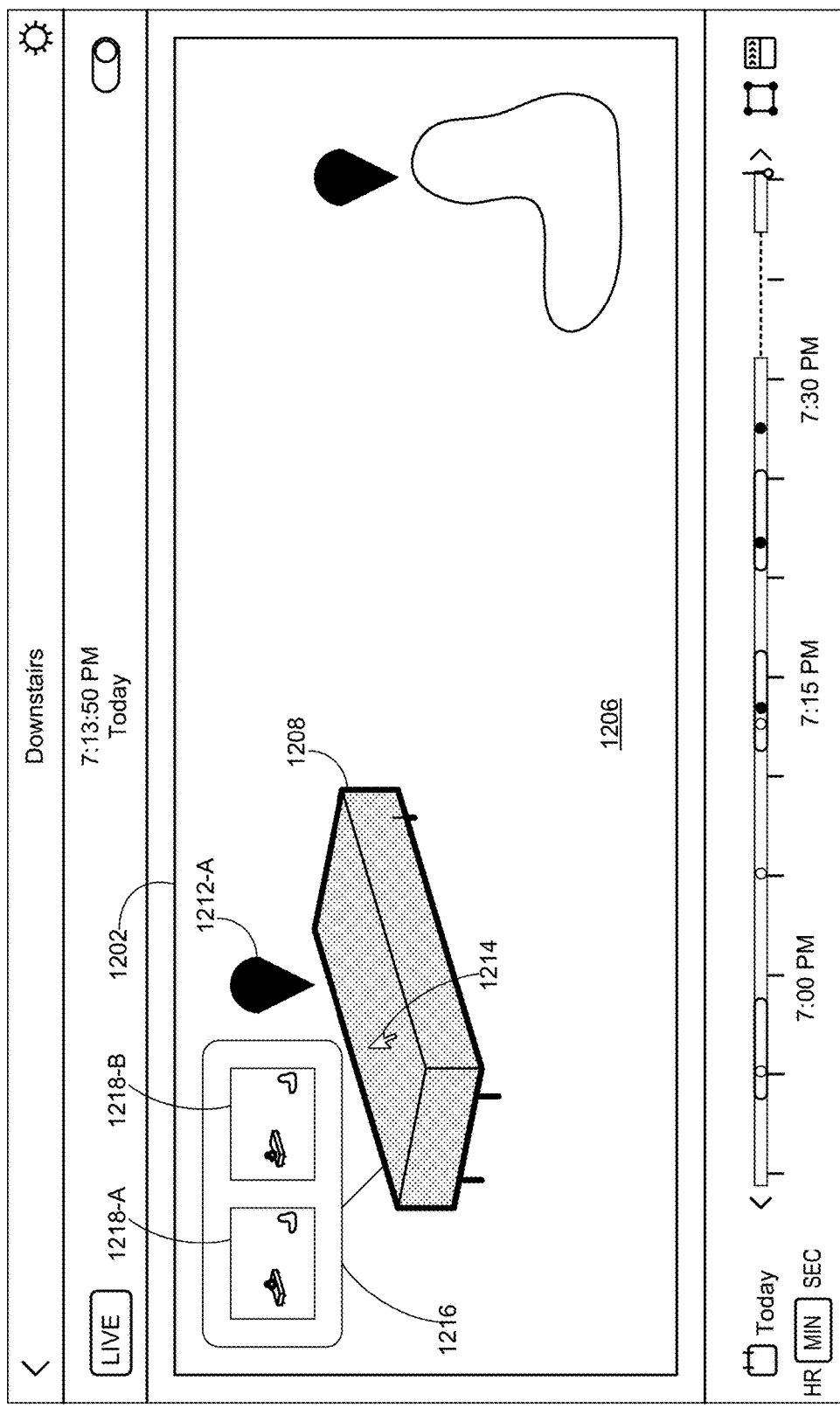

As shown in FIG. 12C, object 1208 is highlighted when mouse pointer 1214 hovers over it. In some implementations, when mouse pointer 1214 is hovered over object 1208, a call-out 1216 is displayed, as shown in FIG. 12C. The call-out 1216 includes one or more thumbnails 1218 (e.g., thumbnails 1218-A and 1218-B). A thumbnail 1218 shows a frame from a portion of the video that correspond to a detected event associated with the suggested zone for object 1208. In some implementations, call-outs from the timeline for respective thumbnails of respective video portions are also displayed.

Figure 12D:
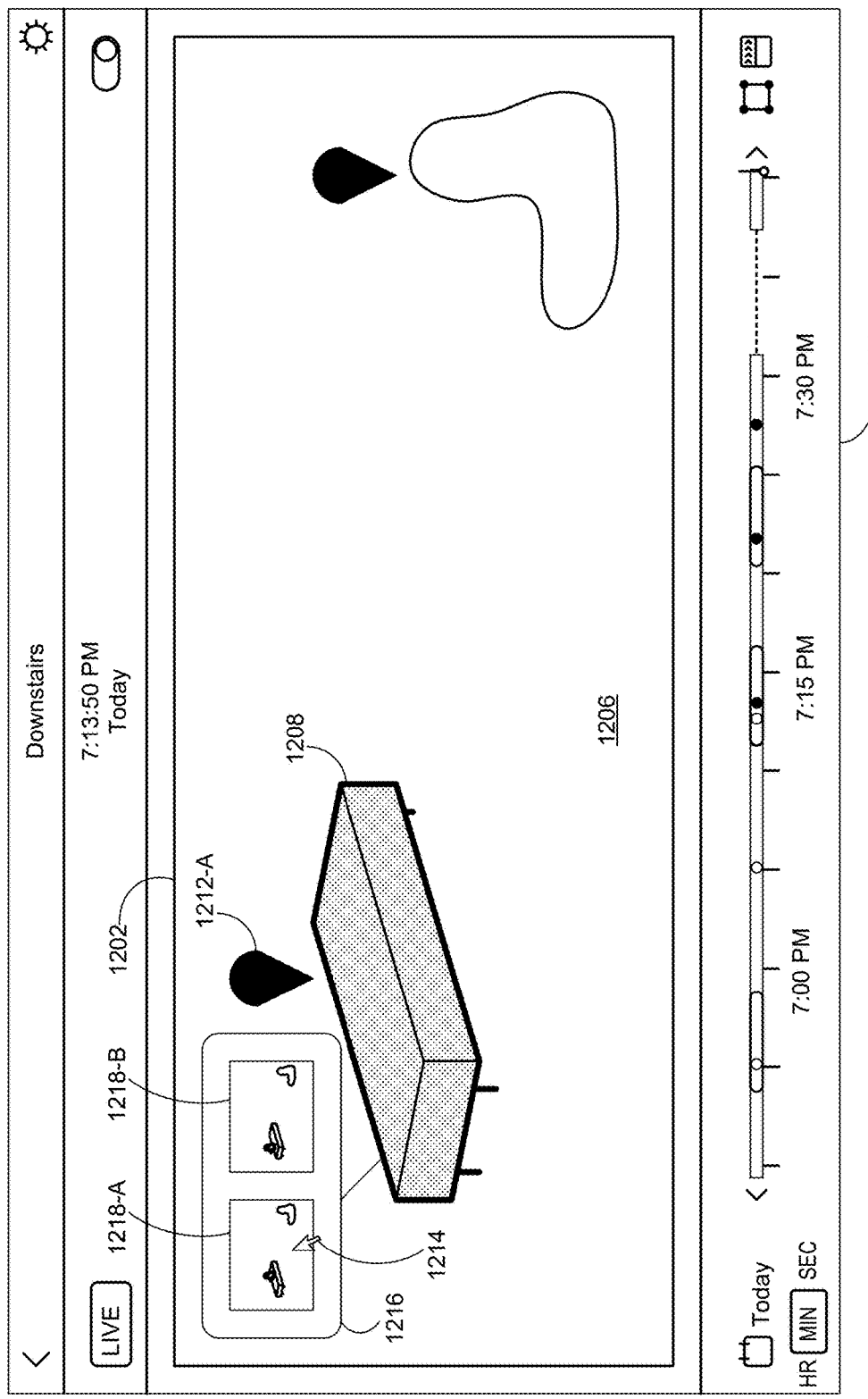
Figure 12E:
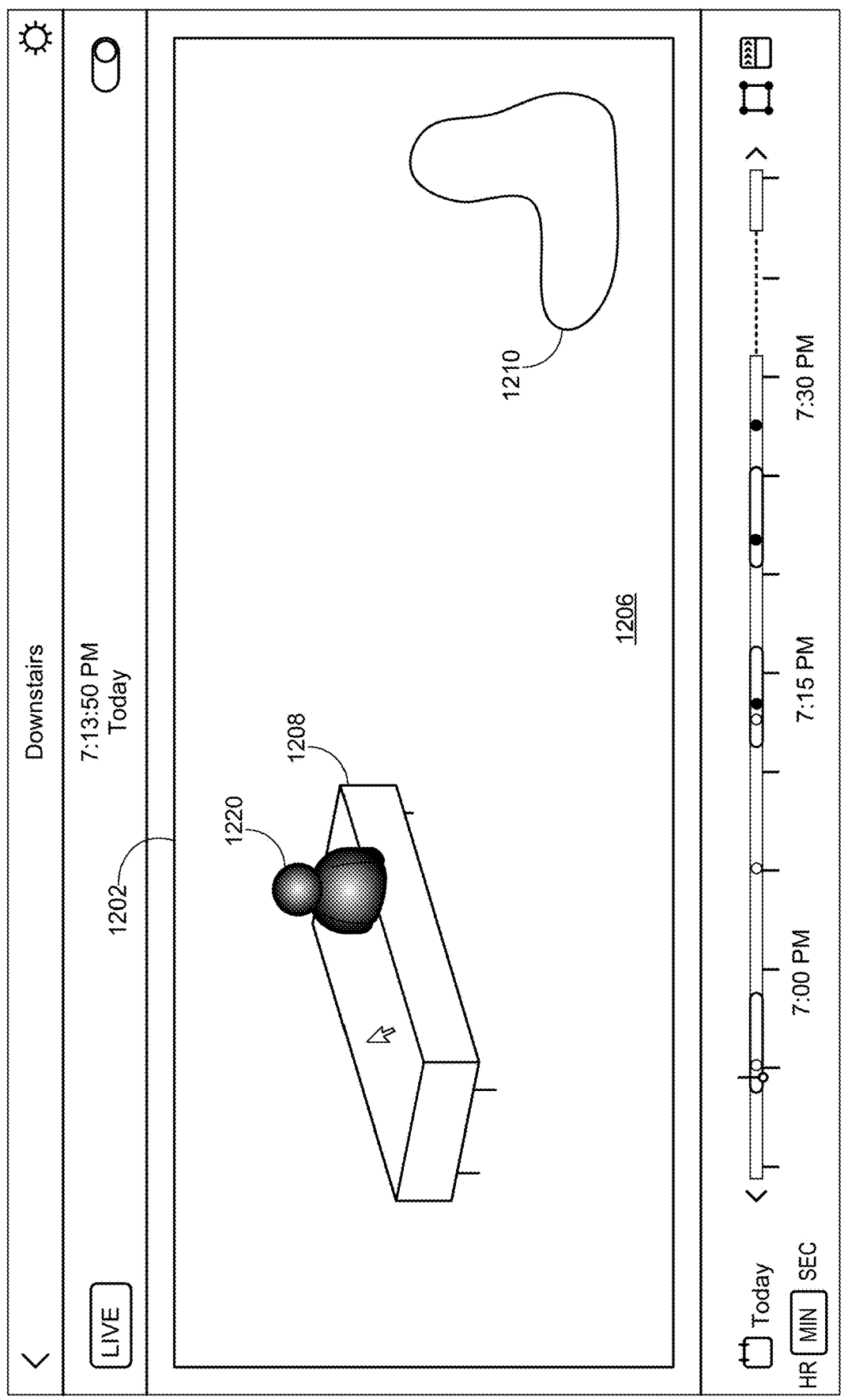

The user may select one of the thumbnails 1218. For example, FIG. 12D shows mouse pointer 1214 moved over thumbnail 1218-A. The user may then select the thumbnail 1218-A (e.g., by clicking on the mouse while mouse pointer 1214 is positioned over thumbnail 1218-A). In response to selection of the thumbnail 1218-A, the video in the video region 1202 plays from the video portion corresponding to the thumbnail 1218-A; the user can view the video portion with the event corresponding to thumbnail 1218-A. For example, in FIG. 12E, the video portion played shows scene 1206 with objects 1208 and 1210, and person 1220 walking around (and triggering the motion event detection). In some implementations, the timeline also jumps to the time of the video portion, and playback of the video portion starts from that time.

In some implementations, the user can accept or reject a marked object as a suggested zone. For example, while mouse pointer 1214 is positioned over object 1208, as in FIG. 12B, the user may select the object 1208 (e.g., by clicking on the mouse). In response to selection of the object 1208, a prompt or other affordance to accept or reject the object 1208 as a defined zone may be displayed. In some implementations, the boundaries of the defined zone follow the contours of the object 1208 as detected by the server 508/552 or by the camera 118. In some implementations, the boundaries of the defined zone enclose the object 1208 (and do not necessarily follow the contours of the object), and form a polygonal region (e.g., a rectangle, a parallelogram, etc.). If the user accepts the object 1208 as a zone, the area of the object 1208 in the video becomes a zone like a user-defined zone; motion events detected as occurring in the zone are indicated as an event associated with the zone and notifications may be generated as such. If the user rejects the object 1208 as a zone, the suggested zone definition for the object 1208 is ignored, and motion events detected as occurring in what otherwise would be the zone for the object 1208 are considered to be motion events not associated with a particular zone, unless the motion events happen to overlap with another zone, in which case the events will be associated with that zone. In some implementations, a rejected suggested zone is deleted from suggested zone definitions 736 and 840. In some implementations, the user may also designate a suggested zone that has been accepted as an alerting zone or a suppression zone. If the zone is an alerting zone, the server generates alerts or notifications for motion events detected in the zone. If the zone is a suppression zone, the server forgoes generating alerts and notifications for motion events detected in the zone. In some implementations, rejection of a suggested zone is implicitly considered a designation of the suggested zone as a suppression zone (e.g., if the rejected suggested zone is retained in suggested zone definitions 736/840 after being rejected). Further, in some implementations, a suggested zone definition, after being accepted by the user, may be subsequently edited by the user (e.g., the user may edit the size and boundaries of the zone, the user may delete the zone, the user may disable alerts and notifications for the zone).

In some implementations, an object as detected by the server 508/552 or by the camera 118 may include multiple objects in real life. For example, if in the video a couch and a coffee table are close together (e.g., overlapping), they may be detected together as a single object, and the detected contours of the single object follow the outer edges of the two real-life objects as if they are one shape, and/or the boundaries of the suggested zone definition encloses both the couch and the coffee table.

In some implementations, the thumbnail call-out (e.g., call-out 1216) is displayed when the user selects the object (e.g., object 1208) once, and then the prompt or affordance to accept or reject the suggested zone is displayed when the user selects the object again.

As described above, a prompt to accept or reject a suggested zone definition, or to designate a suggested zone as an alerting zone or a suppression zone, may be displayed to the user. An example of such a prompt is shown in FIG. 14F. FIG. 14F shows a user interface that includes a frame of the video with the suggested zone enclosing the detected object highlighted (in the case of the user interface in FIG. 14F, the detected object is a door) in the frame. The user interface includes an affordance to reject the suggested zone and/or designate the suggested zone as a suppression zone (e.g., a button with the label "I'll pass") and an affordance to accept the suggested zone and/or designate the suggested zone as an alerting zone (e.g., a button with the label "Got it"). The user interface in FIG. 14F assumes that the default is that the zone is accepted and designated as an alerting zone, so the affordance button "Got it" accepts the default action, and the affordance button "I'll pass" rejects the default action and rejects the zone and/or designates the zone as a suppression zone. The affordance labels and functions may differ depending on the particular implementation, where the default actions and the specifics of the prompt may differ.

In some implementations, an alert or notification for motion activity detected in an accepted suggested zone is displayed to the user. An example of such a notification is shown in FIG. 14G. The notification may include a frame of the video and text indicating that there is motion activity detected in the suggested zone (named after the corresponding detected object (e.g., "Door")). In some implementations, alerts or notifications, such as the one shown in FIG. 14G, are displayed for motion activity detected in a suggested zone that had been accepted and designated as an alerting zone. In some implementations, an alert such as the one shown in FIG. 14G is displayed for the first motion activity detected in a newly generated suggested zone definition after generation of the definition, and selection of the notification by the user triggers display of a user interface to accept or reject the zone and/or designation of the zone as alerting or suppression, as in the user interface shown in FIG. 14F.

EXAMPLE PROCESSES

Figure 13:
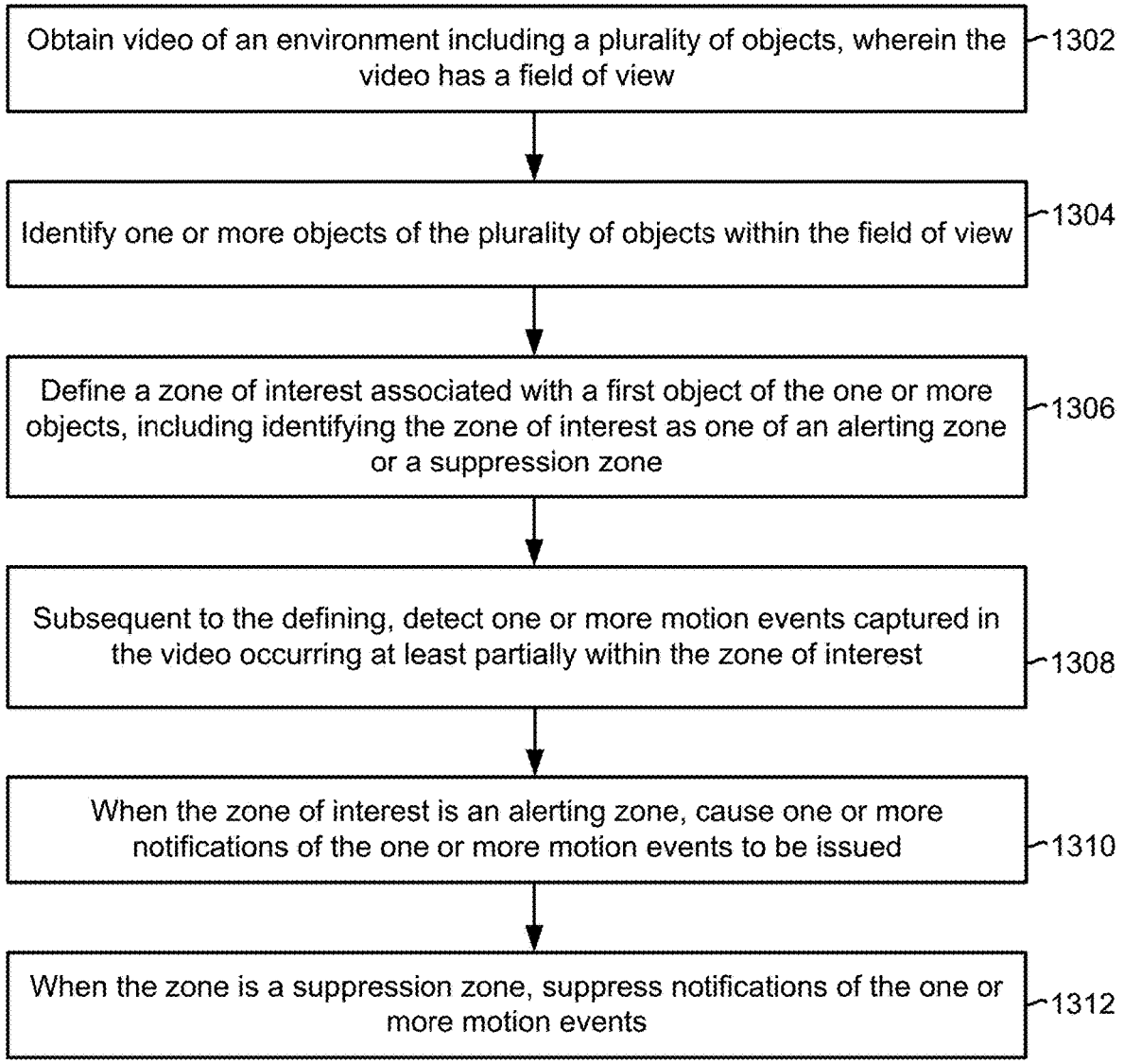
FIG. 13 illustrates a flowchart diagram of a method for defining suggested zones, in accordance with some implementations.

FIG. 13 illustrates a flowchart diagram of a method 1300 for defining suggested zones, in accordance with some implementations. In some implementations, the method 1300 is performed at a computing system with one or more processors and one or more memory components. For example, in some implementations, the method 1300 is performed by server system 508 or 552, or one or more components thereof (e.g., object detection module 73032, sources and sinks detection module 73034, zone definition module 73036, etc.). In some implementations, the method 1300 is governed by instructions that are stored in a non-transitory computer readable storage medium (e.g., the memory 722) and the instructions are executed by one or more processors of a computing system (e.g., the CPUs 718). In some implementations, the method 1300 is performed jointly by the server system 508/552 and a camera 118. In some implementations, the method 1300 is performed by a camera 118, or by a camera 118 and a hub device 180.

The computing system obtains (1302) video of an environment including a plurality of objects, where the video has a field of view. The server system 508/552 obtains video of an environment from a camera 118. The video has a field of view (e.g., scene 1206) and captures one or more objects (e.g., objects 1208, 1210).

The computing system identifies (1304) one or more objects of the plurality of objects within the field of view. The server system 508/552 processes and analyzes the video to detect and identify one or more objects (e.g., objects 1208, 1210) in the scene 1206 captured by the video.

The computing system defines (1306) a zone of interest associated with a first object of the one or more objects, including identifying the zone of interest as one of an alerting zone or a suppression zone. The server system 508/552 processes and analyzes the video, as well as detected motion events, to define a suggested zone for one or more of the detected and identified objects.

Subsequent to the defining, the computing system detects (1308) one or more motion events captured in the video occurring at least partially within the zone of interest. After definition of the zone, the server system 508/552 continues to detect motion events, and one or more motion events in the defined zone may be detected.

When the zone of interest is an alerting zone, the computing system causes (1310) one or more notifications of the one or more motion events to be issued. The server 508/552 issues one or more alerts for motion events detected in the zone if the zone is an alerting zone.

When the zone is a suppression zone, the computing system suppresses (1312) notifications of the one or more motion events. The server 508/552 forgoes issuing one or more alerts for motion events detected in the zone if the zone is a suppression zone.

In some implementations, defining a zone of interest associated with a first object of the one or more objects includes identifying in the field of view one or more source zones and one or more sink zones, determining contours of the first object within the field of view and a first area of the first object defined by the determined contours, determining amounts of overlap between the area of the first object with the source zones and the sink zones in the field of view, and in accordance with a determination that the area of the first object overlaps with an area of a source zone or a sink zone by at least a predefined threshold amount, defining the area of the first object as the zone of interest. In some implementations, the server identifies sources areas and sink areas of motion events in the video scene, determining contours of the objects and corresponding areas bound by the respective contours, and determine amounts of overlap between the object areas and source/sink areas. If an object area overlaps a source/sink area by more than a threshold, the corresponding object is "selected" from the multiple objects and the corresponding area bound by its contours is set as a suggested zone definition for the object. In this manner, source and sink areas are an input for narrowing down the set of objects for which suggested zones are defined.

In some implementations, the computing system detects a change in the field of view, identifies the first object within the changed field of view, determines contours of the first object within the changed field of view and a second area of the first object defined by the determined contours within the changed field of view, and defines the second area of the first object as the zone of interest. The camera 118 may be disturbed (e.g., the camera was rotated or moved), causing the scene captured in the video of the camera 118 to change. The server receives the video from the disturbed camera, detects the objects in the changed scene and determines the contours and area of the objects within the changed scene. For an object with a defined suggested zone, the suggested zone is redefined as the area of the object bound by the post-camera-disturbance contours. In some implementations, the server detects a change in the scene (e.g., by detecting certain pixel changes), and determines that the camera was disturbed based on the detected scene change. In response to the determination that the camera was disturbed, the server performs the object detection again to detect the objects and corresponding contours again, and re-defines the suggested zones for the re-detected objects; the server automatically updates the object detection and zone definitions in response to a disruption of the camera. In some implementations, an alert that the camera was disrupted and that the objects and zones have been automatically updated is provided to the user.

In some implementations, the computing system detects one or more motion events captured in the video occurring at least partially within the field of view over a predefined period of time. The server 508/552 detects one more motion events occurring in the scene 1206. These motion events may be analyzed to identify source and sink areas in the scene 1206.

In some implementations, identifying one or more source zones includes determining a number of the motion events that originated from a first region of the field of view within the predefined period of time, determining whether the number of originated motion events exceeds a first predefined threshold, and in accordance with a determination that the number of originated motion events exceeds the first predefined threshold, identifying the region of the field of view as a source zone. The server identifies a source area by analyzing the detected motion events to determine their origination regions in the scene 1206 and how many detected motion events originate from respective regions in the scene 1206. Regions whose number of motion event originations exceeds a threshold are identified as source areas.

In some implementations, identifying one or more sink zones includes determining a number of the motion events that terminated at a second region of the field of view within the predefined period of time, determining whether the number of terminated motion events exceeds a second predefined threshold, and in accordance with a determination that the number of terminated motion events exceeds the second predefined threshold, identifying the region of the field of view as a sink zone. Similarly, sink areas in the scene 1206 may be identified by analyzing the motion events to determine their termination regions in the scene 1206. Regions whose number of motion event terminations exceeds a threshold are identified as sink areas.

In some implementations, defining a zone of interest associated with a first object of the one or more objects includes defining the zone of interest using machine learning (e.g., image analysis, object detector algorithm). In some implementations, defining the zone of interest using machine learning includes comparing one or more frames of the video to a database of images of known objects. The server uses machine learning algorithms and processes (e.g., neural networks, image analysis processes, object detector processes) to detect objects and their contours, and thus to define zones for one or more of these objects by the areas bound by the detected contours. The object and contour detection may include using the image analysis and/or object detector processes to compare images from the video (e.g., individual frames of the video) to one or more databases of images of known objects. In some implementations, each database is associated with a particular type of object. For example, one database may be for images of doors; another database may be for images of couches, sofas, chairs, and the like; and so forth.

In some implementations, identifying one or more objects of the plurality of objects within the field of view includes identifying one or more source zones in the field of view, detecting one or more shapes in the source zones, and for a detected shape, identifying an object to which the detected shape corresponds. The server may detect source areas as described above, and use the source areas as an input for narrowing the areas of the scene 1206 that will be processed for detection of objects. For example, regions of the scene 1206 corresponding to source areas are processed to detect shapes located within, and objects corresponding to the detected shapes are identified. In some implementations, detecting one or more shapes in the source zones includes performing edge detection on the source zones. Shape detection may include detection of edges in the source areas to find lines, associated intersections, and determining which of these lines and associated intersections form the edges of an object in the source area.

In some implementations, identifying an object to which the detected shape corresponds includes selecting a subset of a set of multiple object databases based on the detected shape, and searching the selected subset of object databases to identify an object that best matches the detected shape. In some implementations, selecting a subset of a set of multiple object databases based on the detected shape includes determining a type of the detected shape, and selecting the subset of the set of object databases in accordance with the determined shape type. The particular shape detected may be used as an input for selecting which databases of images of objects to use for identifying the object to which the shape corresponds. For example, if the shape is a 4-sided approximately regular polygon, the database for images of doors may be used and the database for images of couches may be excluded; doors match well with a 4-sided regular polygon, whereas couches tend to be poor match for a 4-sided polygon.

In some implementations, identifying one or more objects of the plurality of objects within the field of view includes identifying one or more sink zones in the field of view, detecting one or more shapes in the sink zones, and for a detected shape, identifying an object to which the detected shape corresponds. In some implementations, detecting one or more shapes in the sink zones includes performing edge detection on the sink zones. In some implementations, identifying an object to which the detected shape corresponds includes selecting a subset of a set of multiple object databases based on the detected shape, and searching the selected subset of object databases to identify an object that best matches the detected shape. In some implementations, selecting a subset of a set of multiple object databases based on the detected shape includes determining a type of the detected shape, and selecting the subset of the set of object databases in accordance with the determined shape type. The server may detect sink areas as described above, and use the sink areas as an input for narrowing the areas of the scene 1206 that will be processed for detection of objects, similar to the use of source areas as an input for narrowing the areas of the scene 1206 that will be processed for detection of objects as described above.

In some implementations, the computing system transmits to a client device information corresponding to the zone of interest, where the client device is configured to enable a user of the client device to review the zone of interest. The server 508/552 transmits information corresponding to suggested zones to a client device 504, and the suggested zones are displayed in the video (e.g., as described above in relation to FIGS. 12A-12E) played at the client device 504. The user interface 1200 displayed at the client device 504 is configured to allow the user to review the suggested zones (e.g., see thumbnails 1218 of associated events, accept or reject the suggested zone.

In some implementations, the computing system determines a label associated with the first object, and associates the label with the zone of interest. In some implementations, the server assigns a label to a suggested zone. For example, an assigned label may be as simple as what the object is (e.g., "Door," "Window," "Chair").

In accordance with some implementations, a method for presenting suggested zones is performed at computing system with one or more processors, a display, and memory. For example, in some implementations, the method is performed by a client device 504. In some implementations, the method is governed by instructions that are stored in a non-transitory computer readable storage medium (e.g., the memory 806) and the instructions are executed by one or more processors of the computing system (e.g., the CPUs 802).

The computing system displays on the display a video of an environment captured by a remote video camera, the video comprising a field of view of the environment, where the field of view encompasses a plurality of objects. The client device 504 displays video from the camera 118 in video region 1202 of user interface 1200. The video captures a scene 1206 of an environment with one or more objects (e.g., objects 1208, 1210).

The computing system displays a suggested zone of interest associated with a first object of the plurality of objects. The client device 504 highlights an object that is a suggested zone. For example, FIG. 12C shows marked and highlighted object 1208 that is a suggested zone.

The computing system provides an affordance indicating an opportunity for a user of the computing system to accept or reject the suggested zone of interest. The computing system receives a user response, via the affordance, reflecting a user acceptance or rejection of the suggested zone of interest. If the user selects a marked object, the client device 504 may display a prompt to accept or reject the suggested zone corresponding to the marked object. The user interacts with the affordance to accept or reject the suggested zone.

When the user response is the user acceptance, the computing system subsequently provides or suppresses alerts to the user in response to one or more motion events detected as occurring at least partially within the suggested zone. If the user accepts the suggested zone, the client device 504 presents or forgoes presenting alerts to the user for motion events detected in the accepted zone. Whether alerts are presented or forgone depends on whether the accepted zone is an alerting zone or suppressing zone. In some implementations, whether alerts are presented or not depend on whether alerts are provided by the server 508/552 in accordance with a designation of the zone as an alerting zone or suppression zone.

In some implementations, the computing system receives a user designation of the suggested zone as an alerting zone or a suppression zone. In some implementations, providing or suppressing alerts to the user in response to one or more motion events detected as occurring at least partially within the suggested zone includes providing one or more alerts to the user in response to the one or more motion events in accordance with the designation of the suggested zone as an alerting zone. In some implementations, providing or suppressing alerts to the user in response to one or more motion events detected as occurring at least partially within the suggested zone includes suppressing alerts to the user in response to the one or more motion events in accordance with the designation of the suggested zone as a suppression zone. The user may also designate the suggested zone as an alerting zone or a suppression zone. The client device 504 provides alerts for motion events detected in an accepted zone designated as an alerting zone, and suppresses alerts for motion events detected in an accepted zone designated as a suppression zone.

In some implementations, the computing system detects user selection of the suggested zone of interest, and in accordance with the user selection of the suggested zone of interest, displaying thumbnails of one or more video segments, each of the one or more video segments associated with a motion event detected as having occurred at least partially in the suggested zone of interest. When the user selects the object, or hovers a mouse pointer or cursor over the object, a call-out 1216 of thumbnails of video portions corresponding to motion events detected in the suggested zone is displayed.

In some implementations, when the user response is the user rejection, classifying the one or more motion events detected as occurring at least partially within the suggested zone as motion events not associated with a specific zone of interest. If the user rejects the zone, motion events detected in the rejected zone may be classified as motion events not associated with any particular zone or with another zone with which the motion event overlaps.

In some implementations, boundaries of the suggested zone of interest associated with the first object follow contours of the first object the field of view. For example, FIG. 12C shows the contours of the object 1208 highlighted; the boundaries of the suggested zone follow the contours of the object.

In some implementations, the processing and analysis of the video by the server system 508/552 to detect one or more objects and generating suggested zones includes processing and analyzing a single frame of the video, potentially at different scales and/or resolutions, for the presence of a particular object (e.g., a door), and generating a suggested zone definition for the analyzed frame based on which region of the frame (and potentially scale and/or resolution) yields the highest confidence with respect to detection of the particular object. This analysis may be performed for multiple types of objects (e.g., doors, windows, etc.) to detect particular objects in the video. In some implementations, this single frame analysis may be performed multiple times in response to various events. For example, the analysis may be performed at different times of the day (such as when maximum ambient light is expected based on a geographic location of the camera and time of day), or in response to a detected change in placement of the camera, or in response to a threshold amount of ambient light being detected by the camera.

In some implementations, analysis of the video by the server system 508/552 to detect one or more objects includes processing multiple frames from the video over time (e.g., analyzing a number of frames per unit time over a predefined time period), and aggregating the analysis results (e.g., areas and/or contours of detected objects, suggested zone definitions, and/or confidence levels). For example, over a 24-hour period, frames may be sampled from the video and analyzed at a rate of one frame per hour. This periodic sampling and analysis may facilitate analysis of the same scene over time to account for different lighting conditions, shadow positions, and so forth. Analysis of each hourly-sampled frame may yield various results regarding detected objects, corresponding contours/regions, and/or associated confidence levels. In some implementations, for each hourly-sampled frame, a detected object and its corresponding contour and region (or a polygonal region enclosing the detected object) may be made a suggested zone definition for that frame without necessarily considering source and/or sink areas.

The detected objects and suggested zone definitions for the sampled frames over the entire predefined period may be aggregated. In some implementations, the aggregation includes comparing the detected objects and suggested zone definitions and looking for areas of intersection over the multiple sampled frames. The areas of the detected objects may be treated like heatmaps, and areas of intersection with the highest confidence levels are set as the area of the detected object. In this manner, objects may be detected for video captured by a newly installed camera 118 that may not have sufficient motion activity captured for sources and sinks analysis.

In some implementations, the object detection by frame sampling and analysis over a predefined time period, or even by analysis of a single frame, may be performed at or during one or more of a variety of instances, e.g., when the camera 118 is first installed and turned on, whenever disruption of the camera is detected (e.g., the camera 118 was physically repositioned or reoriented), and/or periodically (e.g., monthly, weekly, bi-weekly). Also, if the camera 118 is moved often (e.g., camera disruption is detected at a rate above a predefined threshold), the object detection may be held off until the camera disruption rate is below the threshold for at least a predefined amount of time (e.g., for a day). In some implementations, a change in the scene is detected (e.g., by detecting certain pixel changes), and a determination that the camera was disturbed is made based on the detected scene change. In response to the determination that the camera was disturbed, the object detection and zone definition generation is performed again to re-detect the objects corresponding contours, and to update the suggested zones for the re-detected objects; the object detection and zone definitions are automatically updated in response to a disruption of the camera. In some implementations, an alert, notification, or prompt that the camera was disrupted and that the objects and suggested zones have been automatically updated may be provided to the user (e.g., a user may be asked to accept the updated object detection and zone definition in a user interface similar to the user interface shown in FIG. 14F).

In some implementations, the object detection may detect particular types of objects, and suggested zone definitions for these particular types of objects are automatically designated as suppression zones. For example, the video may be processed and analyzed (e.g., in the various ways described above) to detect, among various objects, television, computer or other electronic display screens. A suggested zone definition for such a detected screen may be automatically designated as a suppression zone by default. In this manner, types of objects that are commonly associated with false alarm motion activity (e.g., electronic display screen) may be designated as suppression zones, so that the user is not notified of insignificant motion activity (e.g., motion in the programming displayed on the television or other electronic display screen). In some implementations, movement of such a display screen may be tracked (by, e.g., performing periodic object detection) and notifications from the zone corresponding to the screen are continuously suppressed. For example, movement of a laptop or tablet screen may be tracked and motion displayed on the screen is suppressed as a user is not likely to be interested in receiving motion alerts for motion detected on an in-house electronic display regardless of whether that display is stationary or mobile.

While the specification describes methods and processes as performed by particular systems or devices, it should be appreciated that the described methods and processes may be performed by a variety of appropriate systems and devices, and combinations thereof. For example, analysis of frames of the video to detect objects may be performed by a server system (e.g., server system 508/552), a camera (e.g., camera 118), a hub device (e.g., hub device 180), a camera and a server system, a camera and a hub device, or a server system and a hub device.

EXAMPLE SCREENSHOTS

FIGS. 14A-14E illustrate example screenshots of user interfaces on a client device in accordance with some implementations. In some implementations, the user interfaces depicted in FIGS. 14A-14E are user interfaces for a smart home application on a client device (e.g., client device 504) or for a smart home management website displayed in a web browser application on the client device 504.

Figure 14A:
FIGS. 14A-14G illustrate example screenshots of user interfaces on a client device in accordance with some implementations.

FIG. 14A illustrates a user interface with a video region and a timeline region; FIG. 14A illustrates another example of the user interface described above with reference to FIG. 12A. Video is displayed in the video region, and marks are shown in the video region to mark objects detected in the video and for which a suggested zone is defined. The timeline region shows a timeline with indications of video availability and detected events (e.g., motion events).

Figure 14B:

FIG. 14B illustrates the user interface, with a mouse pointer hovered over one of the marked objects. The marked object is highlighted; FIG. 14B illustrates another example of the user interface described above with reference to FIG. 12B.

Figure 14C:
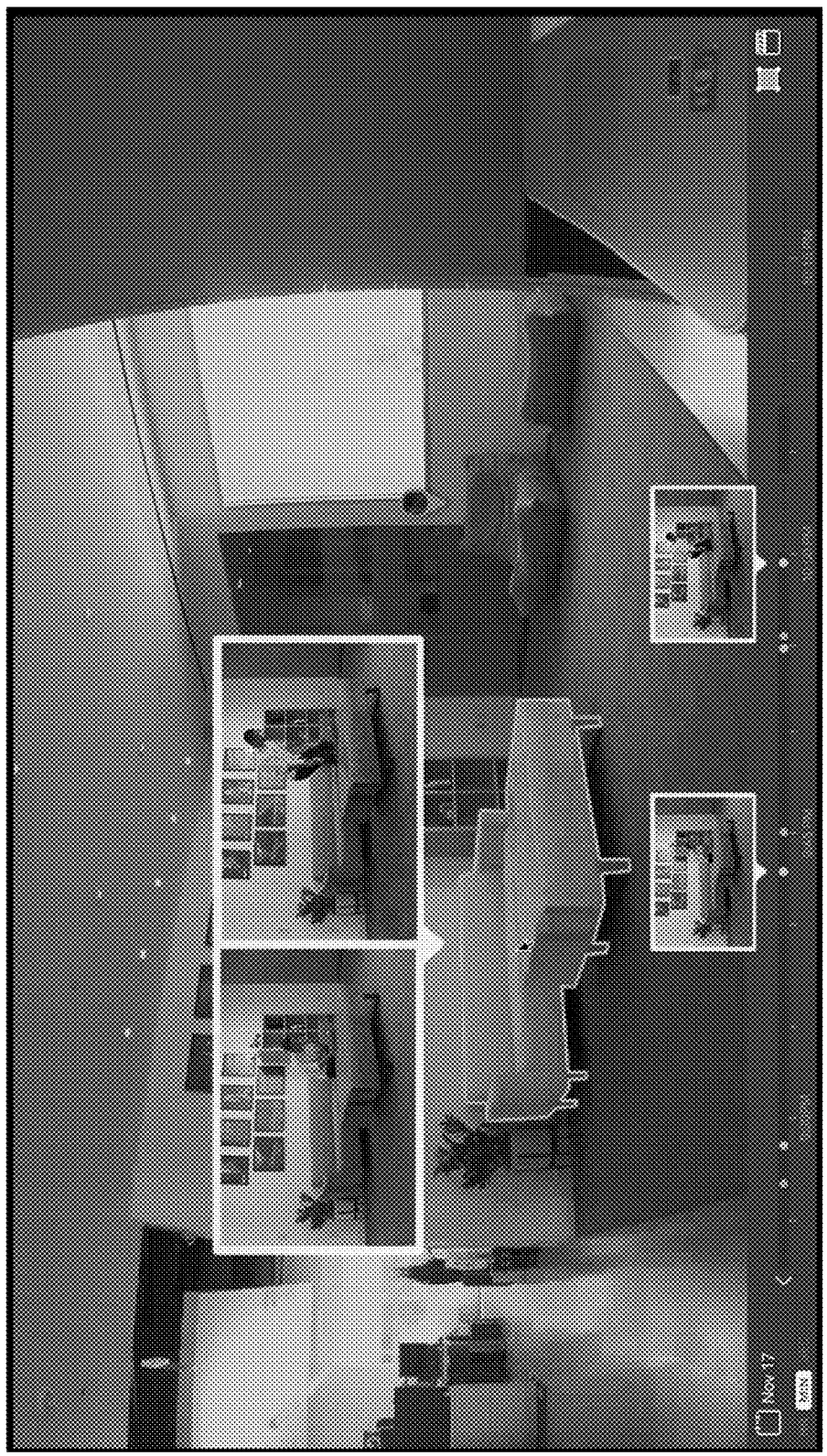

FIG. 14C illustrates the user interface, with the contours of the marked object highlighted and a call-out for the marked object; FIG. 14C illustrates another example of the user interface described above with reference to FIG. 12C. The call-out includes one or more thumbnails of video portions associated with motion events detected as associated with the suggested zone corresponding to the marked object (e.g., the motion event occurred in the zone). In some implementations, call-outs from the timeline for respective thumbnails of the video portions are also displayed.

Figure 14D:
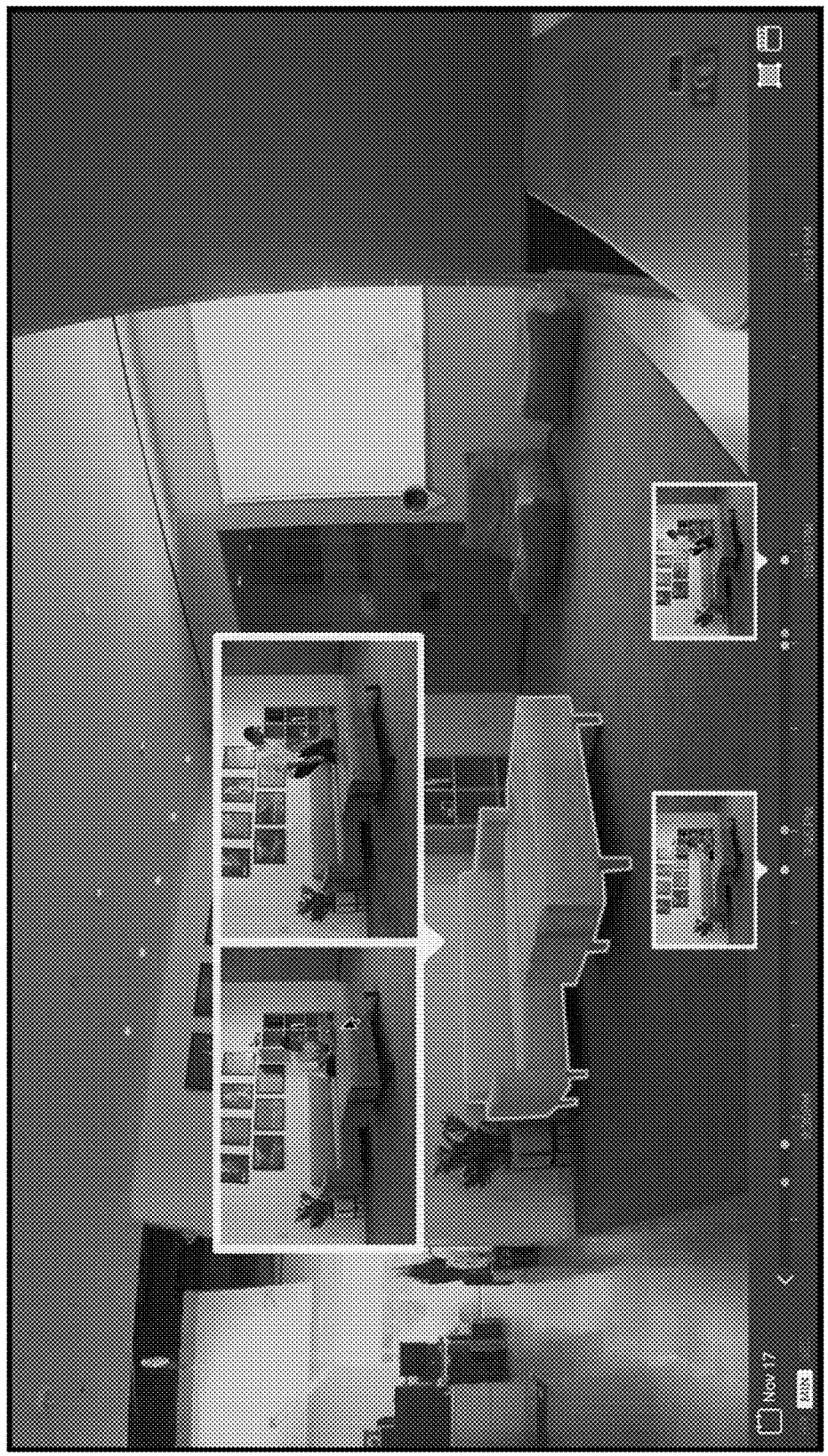

FIG. 14D illustrates the user interface, with the mouse pointer positioned over one of the thumbnails in the call-out for the marked object; FIG. 14D illustrates another example of the user interface described above with reference to FIG. 12D. The user may click on that thumbnail to select it.

Figure 14E:
Figure 14F:
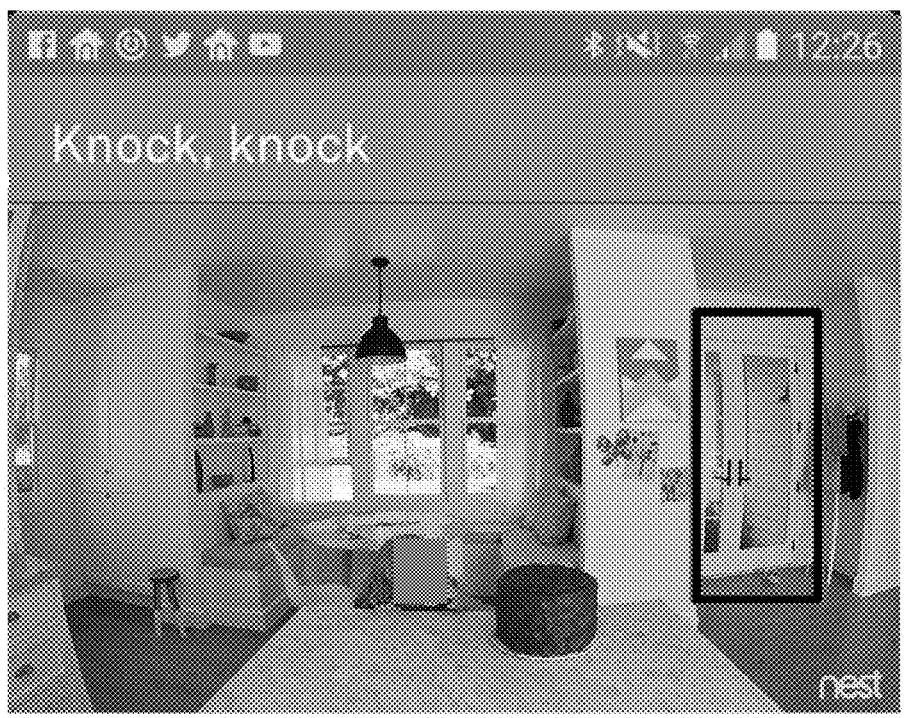
Figure 14F:
Figure 14F:
Figure 14G:
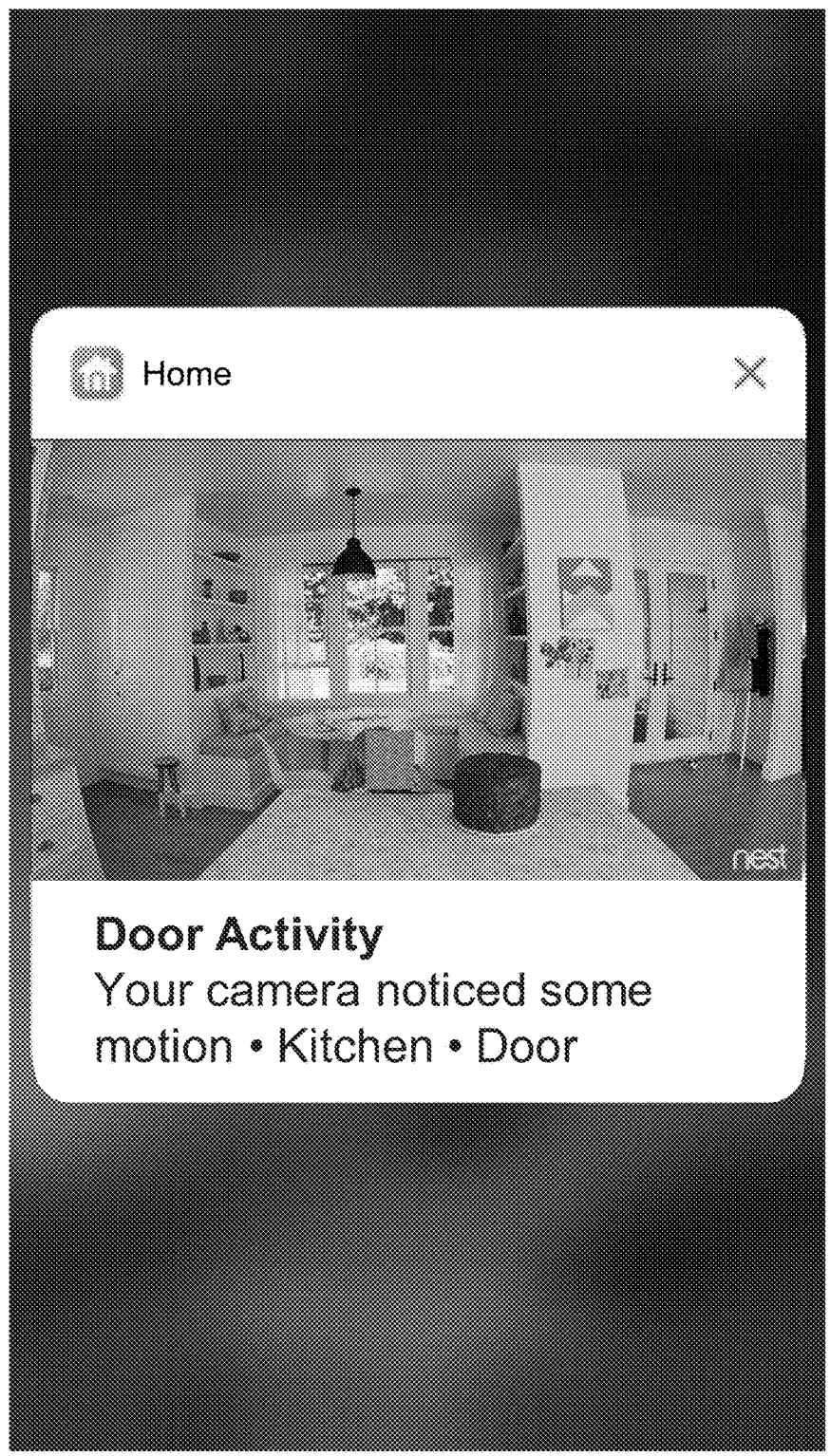

In response to selection of the thumbnail, the video portion corresponding to the thumbnail is played in the video region, as shown in FIG. 14E; FIG. 14E illustrates another example of the user interface described above with reference to FIG. 12E.

FIG. 14F illustrates an example prompt that may be presented to a user when a suggested zone for an object is defined. In this prompt, the particular object that is detected is a door, which is highlighted in a frame from the video feed included in the prompt. In some implementations, a user interface similar as shown in FIG. 14F may be displayed when an object is detected in accordance with the methods and processes described above.

FIG. 14G illustrates an example notification that may be presented to a user when motion activity is detected in a zone corresponding to a detected object. The notification names the particular zone corresponding to the detected object in which motion activity was detected, and may also include a frame from the portion of the video with the detected motion activity.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
    at a computing system having one or more processors, and one or more memory components storing one or more programs for execution by the one or more processors:
        obtaining video of an environment including a plurality of objects, wherein the video has a field of view;
        identifying one or more objects of the plurality of objects within the field of view;
        without user interaction, defining a zone of interest associated with a first object of the one or more objects, including identifying the zone of interest as one of an alerting zone or a suppression zone based on an object type of the first object;
        subsequent to the defining, detecting one or more motion events captured in the video occurring at least partially within the zone of interest;
        in accordance with the zone of interest being an alerting zone, causing one or more notifications of the one or more motion events to be issued; and
        in accordance with the zone of interest being a suppression zone, suppressing notifications of the one or more motion events.

2. The method of claim 1, wherein defining a zone of interest associated with a first object of the one or more objects comprises:
    identifying in the field of view:
        one or more source zones, and
        one or more sink zones;
    determining contours of the first object within the field of view and a first area of the first object defined by the determined contours;
    determining amounts of overlap between the area of the first object with the source zones and the sink zones in the field of view; and
    in accordance with a determination that the area of the first object overlaps with an area of a source zone or a sink zone by at least a predefined threshold amount, defining the area of the first object as the zone of interest.

3. The method of claim 2, further comprising:
    detecting a change in the field of view;
    identifying the first object within the changed field of view;
    determining contours of the first object within the changed field of view and a second area of the first object defined by the determined contours within the changed field of view; and
    defining the second area of the first object as the zone of interest.

4. The method of claim 2, further comprising: detecting one or more motion events captured in the video occurring at least partially within the field of view over a predefined period of time.

5. The method of claim 4, wherein identifying one or more source zones comprises:
    determining a number of the motion events that originated from a first region of the field of view within the predefined period of time;
    determining whether the number of originated motion events exceeds a first predefined threshold; and
    in accordance with a determination that the number of originated motion events exceeds the first predefined threshold, identifying the region of the field of view as a source zone.

6. The method of claim 4, wherein identifying one or more sink zones comprises:
    determining a number of the motion events that terminated at a second region of the field of view within the predefined period of time;
    determining whether the number of terminated motion events exceeds a second predefined threshold; and
    in accordance with a determination that the number of terminated motion events exceeds the second predefined threshold, identifying the region of the field of view as a sink zone.

7. A computing system, comprising:
    one or more processors;
    one or more memory components; and
    one or more programs stored in the one or more memory components and configured for execution by the one or more processors, the one or more programs comprising instructions for:
        obtaining video of an environment including a plurality of objects, wherein the video has a field of view;
        identifying one or more objects of the plurality of objects within the field of view;
        without user interaction, defining a zone of interest associated with a first object of the one or more objects, including identifying the zone of interest as one of an alerting zone or a suppression zone based on an object type of the first object;

subsequent to the defining, detecting one or more motion events captured in the video occurring at least partially within the zone of interest;

in accordance with the zone of interest being an alerting zone, causing one or more notifications of the one or more motion events to be issued; and in accordance with the zone of interest being a suppression zone, suppressing notifications of the one or more motion events.

8. The computing system of claim 7, wherein defining a zone of interest associated with a first object of the one or more objects comprises defining the zone of interest using machine learning.

9. The computing system of claim 8, wherein defining the zone of interest using machine learning comprises comparing one or more frames of the video to a database of images of known objects.

10. The computing system of claim 7, wherein identifying one or more objects of the plurality of objects within the field of view comprises:

identifying one or more source zones in the field of view;
detecting one or more shapes in the source zones; and
for a detected shape, identifying an object to which the detected shape corresponds.

11. The computing system of claim 10, wherein identifying an object to which the detected shape corresponds comprises:

selecting a subset of a set of multiple object databases based on the detected shape; and
searching the selected subset of object databases to identify an object that best matches the detected shape.

12. The computing system of claim 11, wherein selecting a subset of a set of multiple object databases based on the detected shape comprises:

determining a type of the detected shape; and
selecting the subset of the set of object databases in accordance with the determined shape type.

13. The computing system of claim 10, wherein detecting one or more shapes in the source zones comprises:

performing edge detection on the source zones.

14. A non-transitory computer readable storage medium storing one or more programs, the one or more programs comprising instructions, which, when executed by a computing system having one or more processors, cause the computing system to perform operations comprising:

obtaining video of an environment including a plurality of objects, wherein the video has a field of view;

identifying one or more objects of the plurality of objects within the field of view;

without user interaction, defining a zone of interest associated with a first object of the one or more objects, including identifying the zone of interest as one of an alerting zone or a suppression zone based on an object type of the first object;

subsequent to the defining, detecting one or more motion events captured in the video occurring at least partially within the zone of interest;

in accordance with the zone of interest being an alerting zone, causing one or more notifications of the one or more motion events to be issued; and in accordance with the zone of interest being a suppression zone, suppressing notifications of the one or more motion events.

15. The computer readable storage medium of claim 14, wherein the operations further comprise: transmitting to a client device information corresponding to the zone of interest, wherein the client device is configured to enable a user of the client device to review the zone of interest.

16. The computer readable storage medium of claim 14, wherein the operations further comprise:

determining a label associated with the first object; and
associating the label with the zone of interest.

17. The computer readable storage medium of claim 14, wherein identifying one or more objects of the plurality of objects within the field of view comprises:

identifying one or more sink zones in the field of view;
detecting one or more shapes in the sink zones; and
for a detected shape, identifying an object to which the detected shape corresponds.

18. The computer readable storage medium of claim 17, wherein identifying an object to which the detected shape corresponds comprises:

selecting a subset of a set of multiple object databases based on the detected shape; and
searching the selected subset of object databases to identify an object that best matches the detected shape.

19. The computer readable storage medium of claim 18, wherein selecting a subset of a set of multiple object databases based on the detected shape comprises:

determining a type of the detected shape; and
selecting the subset of the set of object databases in accordance with the determined shape type.

20. The computer readable storage medium of claim 14, wherein detecting one or more shapes in the sink zones comprises:

performing edge detection on the sink zones.

* * * * *